(12) United States Patent
Jiao et al.

(10) Patent No.: US 8,355,028 B2
(45) Date of Patent: Jan. 15, 2013

(54) SCHEME FOR VARYING PACKING AND LINKING IN GRAPHICS SYSTEMS

(75) Inventors: Guofang Jiao, San Diego, CA (US); Alexei V. Bourd, San Diego, CA (US); Chun Yu, San Diego, CA (US); Lingjun Chen, San Diego, CA (US); Yun Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 837 days.

(21) Appl. No.: 11/830,667

(22) Filed: Jul. 30, 2007

(65) Prior Publication Data

US 2009/0033672 A1 Feb. 5, 2009

(51) Int. Cl.
*G06T 1/00* (2006.01)
(52) U.S. Cl. ......................................... 345/522; 345/559
(58) Field of Classification Search .................. 345/522, 345/559
See application file for complete search history.

(56) References Cited

U.S. PATENT DOCUMENTS

| | | | |
|---|---|---|---|
| 5,881,263 A | | 3/1999 | York et al. |
| 5,949,421 A | * | 9/1999 | Ogletree et al. ............... 345/419 |
| 6,704,026 B2 | | 3/2004 | Kurihara et al. |
| 6,717,577 B1 | | 4/2004 | Cheng et al. |
| 6,829,696 B1 | | 12/2004 | Balmer et al. |
| 6,831,653 B2 | | 12/2004 | Kehlet et al. |
| 6,847,369 B2 | | 1/2005 | Lavelle et al. |
| 6,900,812 B1 | | 5/2005 | Morein |
| 7,017,154 B2 | | 3/2006 | Haber et al. |
| 7,570,268 B2 | * | 8/2009 | Noyle ............................ 345/522 |
| 7,746,347 B1 | * | 6/2010 | Brown et al. .................. 345/522 |
| 2002/0196678 A1 | | 12/2002 | Haber et al. |
| 2004/0237074 A1 | * | 11/2004 | Aronson et al. ............... 717/158 |
| 2006/0225061 A1 | | 10/2006 | Ludwig et al. |
| 2008/0094408 A1 | * | 4/2008 | Yin et al. ........................ 345/581 |

FOREIGN PATENT DOCUMENTS

| | | |
|---|---|---|
| JP | 2001195603 A | 7/2001 |
| RU | 2249245 C2 | 3/2005 |
| WO | WO9601024 A1 | 1/1996 |
| WO | WO0116672 A1 | 3/2001 |
| WO | WO03005307 A1 | 1/2003 |

OTHER PUBLICATIONS

Kessenich, John et al., "The OpenGL ES Shading Language," 2006, pp. 1-105, The Khronos Group Inc.
"Kyusik Chung et al: "Vertex Cache of Programmable Geometry Processor for Mobile Multimedia Application" Circuits and Systems, ISCAS 2006. Proceedings. 2006 IEEE International Symposium on KOS Greece May 21-24, 2006.—Piscataway, NJ, USA,IEEE, May 21, 2006, pp. 1908-1911, XP010938761".
European Search Report—EP08006444—Munich—Nov. 20, 2008.
International Search Report—PCT/US2008/071655, The International Search Authority—European Patent Office—Jan. 20, 2009.
Written Opinion—PCT/US2008/071655, The International Search Authority—European Patent Office—Jan. 20, 2009.

* cited by examiner

*Primary Examiner* — Maurice L McDowell, Jr.
(74) *Attorney, Agent, or Firm* — James R. Gambale, Jr.

(57) ABSTRACT

A wireless device which performs a first-level compiler packing process and a second-level hardware packing process on varyings. The compiler packing process packs two or more shader variables (varyings or attributes) whose sum of components equals M into a shared M-dimensional (MD) vector register. The hardware packing consecutively packs M components of the shader variables (varyings or attributes) and any remaining variables into a vertex cache or other storage medium.

37 Claims, 17 Drawing Sheets

```
VERTEXSHADER_FUNCTI
ON_CREATE
"VSF12"
{
vs.1.1
dcl_position0 v0
dcl_texcoord0 v1   ←L1—
dcl_color0 v2      ←L2—
dp4 oPos.x, c0, v0
dp4 oPos.y, c1, v0
dp4 r0.z, c2, v0
mad r1.w, c29.x, -r0.z, c29.y
dp4 r0.w, c3, v0
max r1.w, r1.w,c28.x
add r0.w, r0.w, c4.x
min oFog, r1.w, c28.w
mov oPos.zw, r0
mov oT0.xy, v1      ←L3—
mov oD0, v2         ←L4—
}
```

FIG. 8A

```
VERTEXSHADER_FUNCTI
ON_CREATE
"VSF12"
{
vs.1.1
dcl_position0 v0 dp4 oPos.x, c0, v0
dp4 oPos.y, c1, v0
dp4 r0.z, c2, v0
mad r1.w, c29.x, -r0.z, c29.y
dp4 r0.w, c3, v0
max r1.w, r1.w,c28.x
add r0.w, r0.w, c4.x
min oFog, r1.w, c28.w
mov oPos.zw, r0

```
VERTEXSHADER_FUNCTION
_CREATE
"VSF14"
{
vs.1.1
def c4, 1.0, 0.0, 0.0, 0.0
dcl_position0 v0
dcl_texcoord0 v1
dcl_texcoord1 v2
dcl_texcoord2 v3
dcl_color0 v4
dcl_color1 v5
mad r0, v2.xyzx, c4.xxxy,
c4,yyyx
mul r1.xyz, v2.w, c0
dp4 r1.w, r0, c0
dp4 oPos.x, r1, v0
dp4 r2.w, r0, c2
mul r2.xyz, v2.w, c2
mul r1.xyz, v2.w, c1
dp4 r2.z, r2, v0
dp4 r1.w, r0, c1
mad r2.w, c29.x, -r2.z, c29.y
dp4 oPos.y, r1, v0
max r1.w, r2.w, c28.x
dp4 r0.w, r0, c3
min r1.x, r1.w, c28.w
mov oFog, r1.x
mul r0.xyz, v2.w, c3
mov oD1, r1.x
dp4 r2.w, r0, v0
mov oPos.zw, r2
mov oT0.xy, v1      ←L5—
mov oT1.xy, v1      ←L6—
mov oT2, v3         ←L7—
mov oD0, v4         ←L8—
mov oD1.xyz, v5     ←L9—
}
```

FIG. 9A

```
VERTEXSHADER_FUNCTION
_CREATE
"VSF14"
{
vs.1.1
def c4, 1.0, 0.0, 0.0, 0.0
dcl_position0 v0
dcl_texcoord0 v1
dcl_texcoord1 v2
dcl_texcoord2 v3
dcl_color0 v4
dcl_color1 v5
mad r0, v2.xyzx, c4.xxxy,
c4,yyyx
mul r1.xyz, v2.w, c0
dp4 r1.w, r0, c0
dp4 oPos.x, r1, v0
dp4 r2.w, r0, c2
mul r2.xyz, v2.w, c2
mul r1.xyz, v2.w, c1
dp4 r2.z, r2, v0
dp4 r1.w, r0, c1
mad r2.w, c29.x, -r2.z, c29.y
dp4 oPos.y, r1, v0
max r1.w, r2.w, c28.x
dp4 r0.w, r0, c3
min r1.x, r1.w, c28.w
mov oFog, r1.x
mul r0.xyz, v2.w, c3
mov oD1, r1.x
dp4 r2.w, r0, v0
mov oPos.zw, r2
}
```

FIG. 9B

```
VERTEXSHADER_FUNCTION
_CREATE
"VSF17"
{
vs.1.1
dcl_position0 v0
dp4 oPos.x, c0, v0
dp4 oPos.y, c1, v0
dp4 oPos.z, c2, v0
dp4 oPos.w, c3, v0
mov oFog, v0.w      ◄L10─
mov oT0.xy,v0.w     ◄L11─

```
VERTEXSHADER_FUNCTION
_CREATE
"VSF17"
{
vs.1.1
dcl_position0 v0
dp4 oPos.x, c0, v0
dp4 oPos.y, c1, v0
dp4 oPos.z, c2, v0
dp4 oPos.w, c3, v0

```
VERTEXSHADER_FUNCTION
_CREATE
"VSF25"
{
vs.1.1
def c4, 0.0, 0.0, 0.0, 0.0
dcl_position0 v0
dcl_texcoord0 v1
dcl_color0 v2
dcl_color1 v3
max r0.w, v0.z, c4.w
mad r0.w, r0.w, c7.z, c7.w
mul r0.w, r0.w, r0.w
mad r0.w, r0.w, r0.w, -c7.w
mad r0.xy, c7, r0.w, v0
mov r0.z, v0.z
dp3 r2.x, r0, r0
dp3 r1.x, v0, v0
rsq r1.w, r2.x
rsq r0.w, r1.x
mul r0.xyz, r0, r1.w
rcp r0.w, r0.w
mul r0.xyz, r0, r0.w
mov r0.w, v0.w
dp4 oPos.x, c0, r0
mad r1.w, c29.x, -r1.z, c29.y
dp4 oPos.y, c1, r0
max r2.w, r1.w, c28.x
dp4 r1.w, c3, r0
min r0.x, r2.w, c28.w
mov oPos.zw, r1
mov oFog, r0.x
mov oD1.w, r0.x
mov oT0.xy, v1        ◄L12─
mov oT1.xy, v1        ◄L13─
mov oT2, c4.x         ◄L14─
mov oD0, v2           ◄L15─
mov oD1.xyz, v3       ◄L16─
}
```

FIG. 11A

```
VERTEXSHADER_FUNCTION
_CREATE
"VSF25"
{
vs.1.1
def c4, 0.0, 0.0, 0.0, 0.0
dcl_position0 v0
dcl_texcoord0 v1
dcl_color0 v2
dcl_color1 v3
max r0.w, v0.z, c4.w
mad r0.w, r0.w, c7.z, c7.w
mul r0.w, r0.w, r0.w
mad r0.w, r0.w, r0.w, -c7.w
mad r0.xy, c7, r0.w, v0
mov r0.z, v0.z
dp3 r2.x, r0, r0
dp3 r1.x, v0, v0
rsq r1.w, r2.x
rsq r0.w, r1.x
mul r0.xyz, r0, r1.w
rcp r0.w, r0.w
mul r0.xyz, r0, r0.w
mov r0.w, v0.w
dp4 oPos.x, c0, r0
mad r1.w, c29.x, -r1.z, c29.y
dp4 oPos.y, c1, r0
max r2.w, r1.w, c28.x
dp4 r1.w, c3, r0
min r0.x, r2.w, c28.w
mov oPos.zw, r1
mov oFog, r0.x
mov oD1.w, r0.x
}
```

FIG. 11B

```
VERTEXSHADER_FUNCTION_CREATE
"VSF8"
{
vs.3.0
def c14, 2.0, -1.0, 0.0, 0.0
dcl_position0 v0
dcl_tangent0 v1
dcl_binormal0 v2
dcl_normal0 v3
dcl_texcoord0 v4
dcl_texcoord1 v5
dcl_texcoord0 o0.xy
dcl_texcoord1 o1.xy
dcl_texcoord2 o2.xyz
dcl_texcoord3 o3.xyz
dcl_texcoord4 o4.xyz
dcl_texcoord5 o5.xyz
dcl_texcoord6 o6.xyz
dcl_texcoord7 o7
dcl_position0 o8
dp4 o8.x, v0, c4
dp4 o8.y, v0, c5
dp4 o8.z, v0, c6
add r3.xyz, c13, -v0
mad r2.xyz, c14.x, v1, c14.y
dp4 o8.w, v0, c7
dp3 o2.x, r3, r2
mul r0.w, r0.w, r0.w
mad r0.xyz, c14.x, v2, c14.y
mad r1.xyz, c14.x, v3, c14.y
dp3 o2.y, r3, r0
dp3 o2.z, r3, r1
dp3 o3.x, r2, c8
dp3 o4.x, r2, c9
dp3 o5.x, r2, c10
dp3 o6.x, c11, r2
dp3 o3.y, r0, c8
dp3 o4.y, r0, c9
dp3 o5.y, r0, c10
dp3 o6.y, c11, r0
dp3 o3.z, r1, c8
dp3 o4.z, r1, c9
dp3 o5.z, r1, c10
mad r0.xyz, r1, c12.x, v0
dp3 o6.z, c11, r1
mov r0.w, v0.w
dp4 o7.x, r0, c0
dp4 o7.y, r0, c1
dp4 o7.z, r0, c2
dp4 o7.w, r0, c3
mov o0.xy, v4    ◄L17—
mov o1.xy, v5    ◄L18—
}
}
```

FIG. 12A

```
VERTEXSHADER_FUNCTION_CREATE
"VSF8"
{
vs.3.0
def c14, 2.0, -1.0, 0.0, 0.0
dcl_position0 v0
dcl_tangent0 v1
dcl_binormal0 v2
dcl_normal0 v3
dcl_texcoord0 v4
dcl_texcoord1 v5
dcl_texcoord0 o0.xy
dcl_texcoord1 o1.xy
dcl_texcoord2 o2.xyz
dcl_texcoord3 o3.xyz
dcl_texcoord4 o4.xyz
dcl_texcoord5 o5.xyz
dcl_texcoord6 o6.xyz
dcl_texcoord7 o7
dcl_position0 o8
dp4 o8.x, v0, c4
dp4 o8.y, v0, c5
dp4 o8.z, v0, c6
add r3.xyz, c13, -v0
mad r2.xyz, c14.x, v1, c14.y
dp4 o8.w, v0, c7
dp3 o2.x, r3, r2
mul r0.w, r0.w, r0.w
mad r0.xyz, c14.x, v2, c14.y
mad r1.xyz, c14.x, v3, c14.y
dp3 o2.y, r3, r0
dp3 o2.z, r3, r1
dp3 o3.x, r2, c8
dp3 o4.x, r2, c9
dp3 o5.x, r2, c10
dp3 o6.x, c11, r2
dp3 o3.y, r0, c8
dp3 o4.y, r0, c9
dp3 o5.y, r0, c10
dp3 o6.y, c11, r0
dp3 o3.z, r1, c8
dp3 o4.z, r1, c9
dp3 o5.z, r1, c10
mad r0.xyz, r1, c12.x, v0
dp3 o6.z, c11, r1
mov r0.w, v0.w
dp4 o7.x, r0, c0
dp4 o7.y, r0, c1
dp4 o7.z, r0, c2
dp4 o7.w, r0, c3
}
```

FIG. 12B

SCHEME FOR VARYING PACKING AND LINKING IN GRAPHICS SYSTEMS

BACKGROUND

I. Field

The present disclosure relates generally to the field of graphics processing and, more specifically, to techniques for varying packing and linking in graphic systems.

II. Background

The public graphic standard OpenGL or OpenGL ES has a fixed functionality which can be altered in during per-vertex and per-pixel operations using vertex and fragment shaders. Vertex and fragment shaders have been developed to render special effects which have not been achieved with the default OpenGL functionality.

Referring now to FIG. 1, a general flowchart of the conventional pipeline stages in a graphics processing unit (GPU) with shaders is shown. There are three major pipeline stages: a vertex shader, denoted at block S10, primitive assembler and rasterizer, denoted at block S12, and a fragment shader, denoted at block S14. A further block S16 is provided for per-sample operations.

The vertex shader (VS) S10 is a program or computer program product executed for every vertex of a geometric object. The inputs of the VS S10 are called attributes, denoted at block A2. The VS S10 also accepts as inputs vertex uniforms VU2 which may include a number of vertex uniforms 0~95 (i.e., 96 vertex uniforms). The outputs from the VS S10 and then the primitive assembler & rasterizer S12 are generally referred to as varyings, denoted at block V3, and are typically in a vertex cache (storing VS outputs) or other storage medium (storing rasterizer outputs). The varyings V3 may be values associated with pixels of triangles of a geometric object. The values associated with pixels are the results of the primitive assembler & rasterizer S12 computed based on the VS results associated with vertices of triangles of a geometric object. The VS results associated with the vertices and varyings V3 associated with pixels have the same names or IDs, types and ordering. The varyings V3 associated with pixels are inputs to the fragment shader (FS) S14. The FS S14 also accepts as inputs fragment uniforms FU3 which include generally a number (e.g., 16) of fragment uniforms.

FIG. 2 shows a general block diagram of the conventional pipeline stages with shaders. For a VS S10 inside a graphics processing unit (GPU), there are generally eight (8) attribute registers RA2 to store attributes 0~7. There are generally eight output varying registers RV3A to store varyings 0~7. The varying registers RV3A stores the VS outputs which is usually a vertex cache. There are generally eight output varying registers RV3B to store varyings 0~7. The varying registers RV3B store rasterizer results corresponding to varyings associated with the pixels. The attribute registers RA2 and varying registers RV3A are input registers indexed with attributes 0~7 and output varying registers RV3 indexed with varyings 0~7, respectively. These register IDs are assigned by a compiler that compiles the vertex shader and fragment shader program from a high level language to a machine level language. The registers used in a shader program in a high level language are named by names instead of IDs/indexes. The register names are only viewable from the application developers. Applications access registers via register names. Register IDs are only viewable by the VS S10 or FS S14 in the GPU hardware (HW). Therefore, a symbol table will be created by the compiler, such as a VS input symbol table, output symbol table and FS input symbol table. However, the VS inputs or input symbol table have no relationship with outputs or an output symbol table in terms of contents, IDs and names.

The VS outputs or the output symbol table should match inputs or the input symbol table of the FS S14 in terms of contents and names, although the inputs or the input symbol table of the FS S14 may be a subset of outputs or the output symbol table of the VS S10.

The VS S10 also accepts as inputs the vertex uniforms VU2 stored in a storage medium as well as textures, denoted as T2, and temporary variables, denoted as TV2. The primitive assembler & rasterizer S12 receive the varyings in the output varying registers RV3A indexed with varyings 0~7 and a parameter gl_Position P. The primitive assembler & rasterizer S12 output the varyings in the output varying registers RV3B indexed with varyings 0~7 and the parameter gl_Position P. The FS S14 accepts as inputs the fragment uniforms FU3 stored in a storage medium as well as textures denoted as T3 and temporary variables denoted as TV3. The FS S14 receives the varyings in the output varying registers RV3B indexed with varyings 0~7 and the parameter gl_Position denoted as P. The FS S14 also receives the additional parameters gl_Frontfacing denoted as FF, and gl_PointPosition, denoted as PP. The FS S14 outputs gl_FragColor FC. Attributes and varyings are also called shader variables.

SUMMARY

Techniques for varying packing and linking in graphic pipelines are described herein. Packing of shader variables is beneficial in a mobile GPU so that the storage or memory is used more efficiently. The packing of shader variables may also reduce traffic bandwidth, save power and improve performance.

In one configuration, a device comprises a storage medium having a plurality of shared M-dimensional (MD) registers. The device also includes a processing unit to implement a set of operations to pack in each shared MD register one or more shader variables whose sum of components equals M.

In another configuration, an integrated circuit comprises a storage medium having a plurality of shared M-dimensional (MD) registers. The integrated circuit also includes a processing unit to implement a set of operations to pack in each shared MD register one or more shader variables whose sum of components equals M.

Another configuration includes a computer program product. The computer program product includes a computer readable medium having instructions for causing a computer to pack one or more shader variables of a set of shader variables whose sum of components equals M into each shared M-dimensional (MD) vector register of a plurality of shared MD vector registers.

A still further configuration includes a processor comprising a storage medium having a plurality of shared M-dimensional (MD) registers. The processor also includes an integrated circuit to implement a set of operations to pack in each shared MD register one or more shader variables whose sum of components equals M.

Additional aspects will become more readily apparent from the detailed description, particularly when taken together with the appended drawings

BRIEF DESCRIPTION OF THE DRAWINGS

Aspects and configurations of the disclosure will become more apparent from the detailed description set forth below when taken in conjunction with the drawings in which like reference characters identify corresponding throughout.

FIGS. 8A and 8B show a vertex shader program before and after bypassing attributes are removed.

FIG. 9A and 9B show another vertex shader program before and after bypassing attributes are removed.

FIGS. 10A and 10B show a still further vertex shader program before and after bypassing attributes are removed.

FIGS. 11A and 11B show a still further vertex shader program before and after bypassing attributes are removed.

FIGS. 12A and 12B show a still further vertex shader program before and after bypassing attributes are removed.

Figure 1:
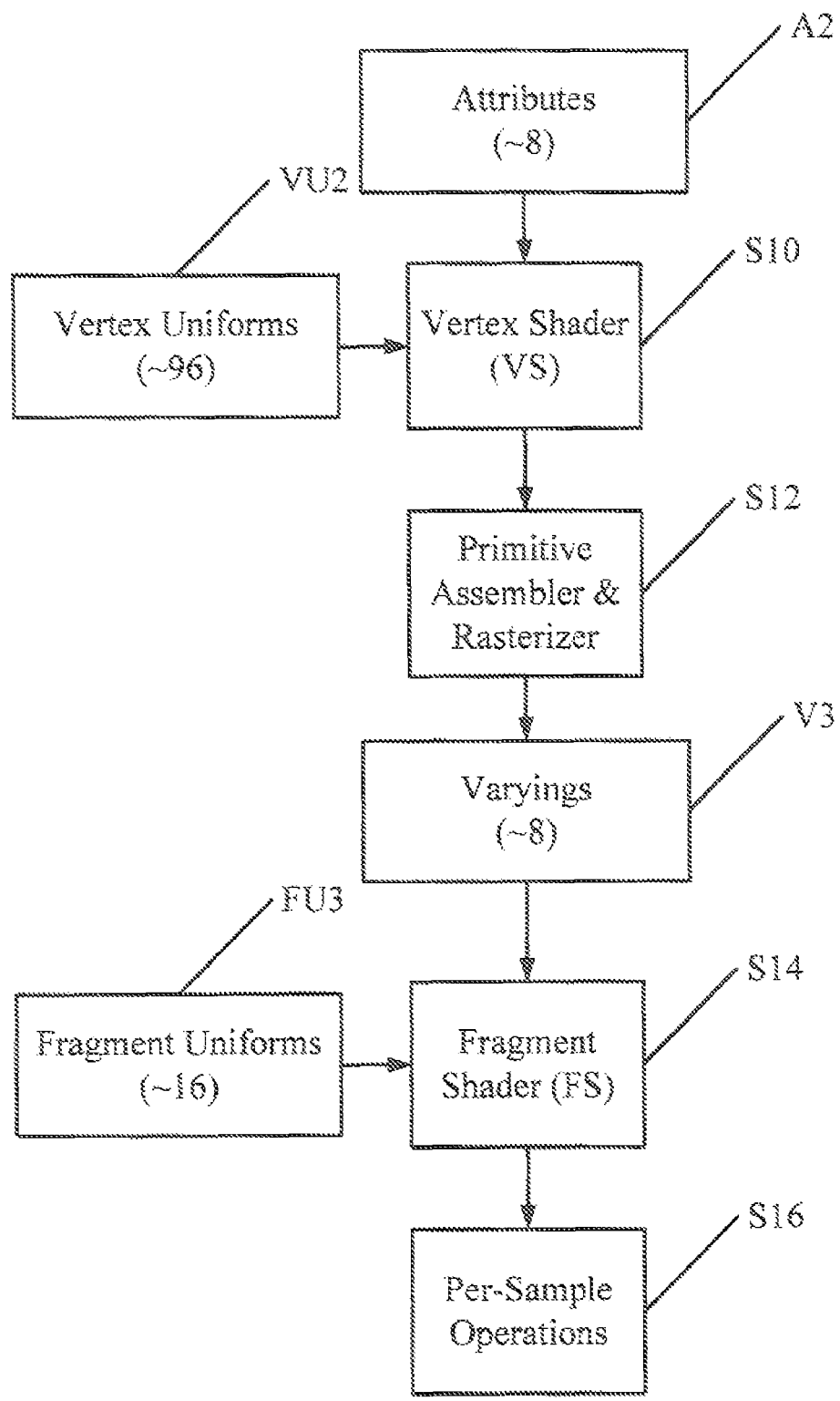
FIG. 1 shows a general flowchart of the conventional pipeline stages in a graphics processing unit with shaders.

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features or steps of one configuration may be beneficially incorporated in other configurations without further recitation.

In various configurations below, flowchart blocks are performed in the depicted order or these blocks or portions thereof may be performed contemporaneously, in parallel, or in a different order.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs.

The techniques described herein may be used for wireless communications, computing, personal electronics, etc. An exemplary use of the techniques for wireless communication is described below.

Figure 3:
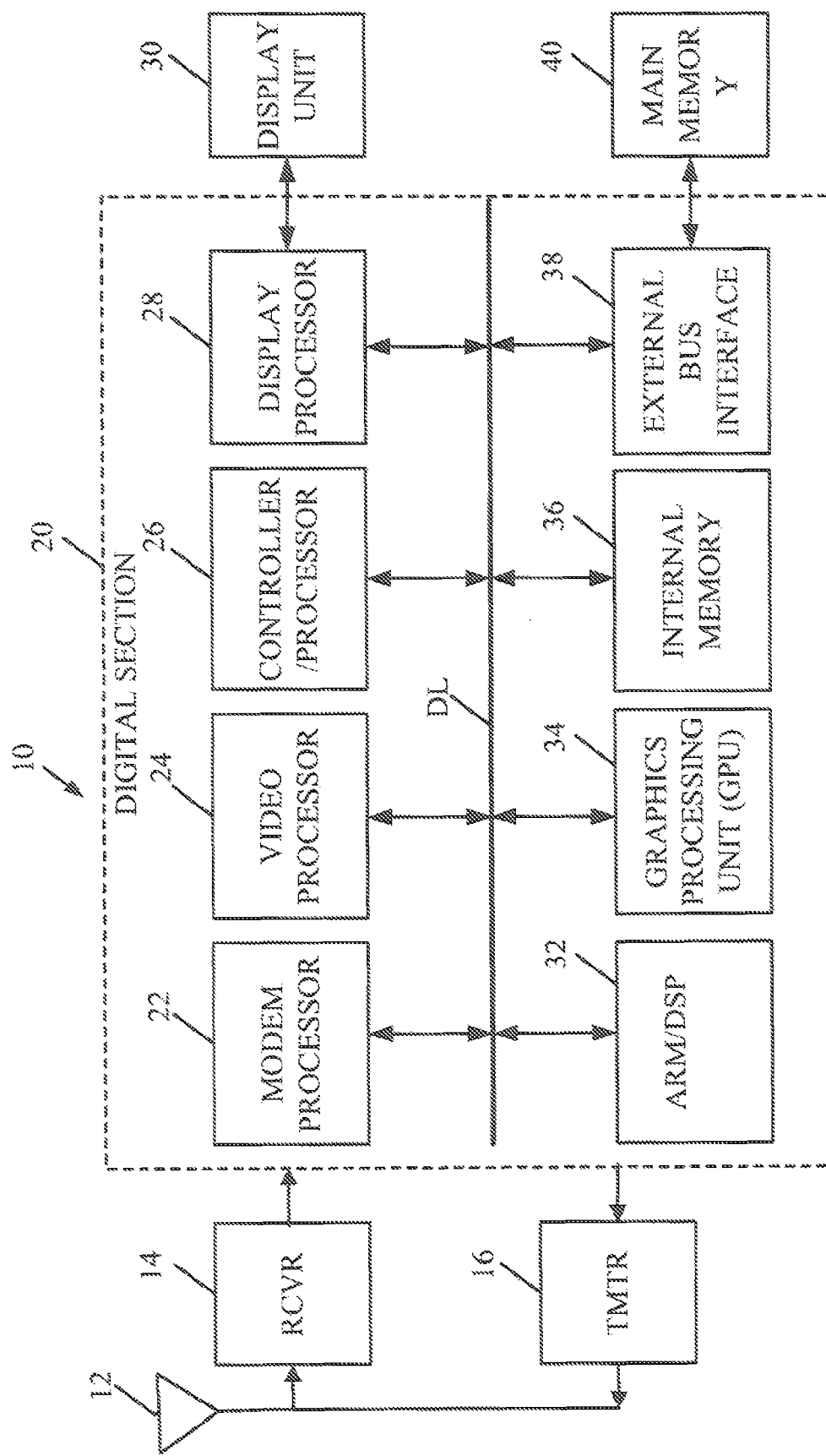
FIG. 3 shows a block diagram of a wireless device.

FIG. 3 shows a block diagram of a configuration of a wireless device 10 for use in a wireless communication system. The wireless device 10 may be a cellular or camera phone, a terminal, a handset, a personal digital assistant (PDA), or some other device. The wireless communication system may be a Code Division Multiple Access (CDMA) system, a Global System for Mobile Communications (GSM) system, or some other system.

The wireless device 10 is capable of providing bi-directional communications via a receive path and a transmit path.

On the receive path, signals transmitted by base stations are received by an antenna 12 and provided to a receiver (RCVR) 14. The receiver 14 conditions and digitizes the received signal and provides samples to a digital section 20 for further processing. On the transmit path, a transmitter (TMTR) 16 receives data to be transmitted from the digital section 20, processes and conditions the data, and generates a modulated signal, which is transmitted via the antenna 12 to the base stations.

The digital section 20 includes various processing, interface and memory units such as, for example, a modem processor 22, a video processor 24, a controller/processor 26, a display processor 28, an ARM/DSP 32, a graphics processing unit (GPU) 34, an internal memory 36, and an external bus interface (EBI) 38. The modem processor 22 performs processing for data transmission and reception (e.g., encoding, modulation, demodulation, and decoding). The video processor 24 performs processing on video content (e.g., still images, moving videos, and moving texts) for video applications such as camcorder, video playback, and video conferencing. The controller/processor 26 may direct the operation of various processing and interface units within the digital section 20. The display processor 28 performs processing to facilitate the display of videos, graphics, and texts on a display unit 30. The ARM/DSP 32 may perform various types of processing for the wireless device 10. The graphics processing unit 34 performs graphics processing of a graphics pipeline.

The techniques described herein may be used for any of the processors in the digital section 20, e.g., the graphics processing unit 34. The internal memory 36 stores data and/or instructions for various units within the digital section 20. The EBI 38 facilitates the transfer of data between the digital section 20 (e.g., internal memory 36) and a main memory 40 along a bus or data line DL.

The digital section 20 may be implemented with one or more DSPs, micro-processors, RISCs, etc. The digital section 20 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

The GPU 34 may also be compliant with a public graphics standard, such as OpenGL2.0, OpenGL ES2.0, or D3D9.0.

Figure 4:
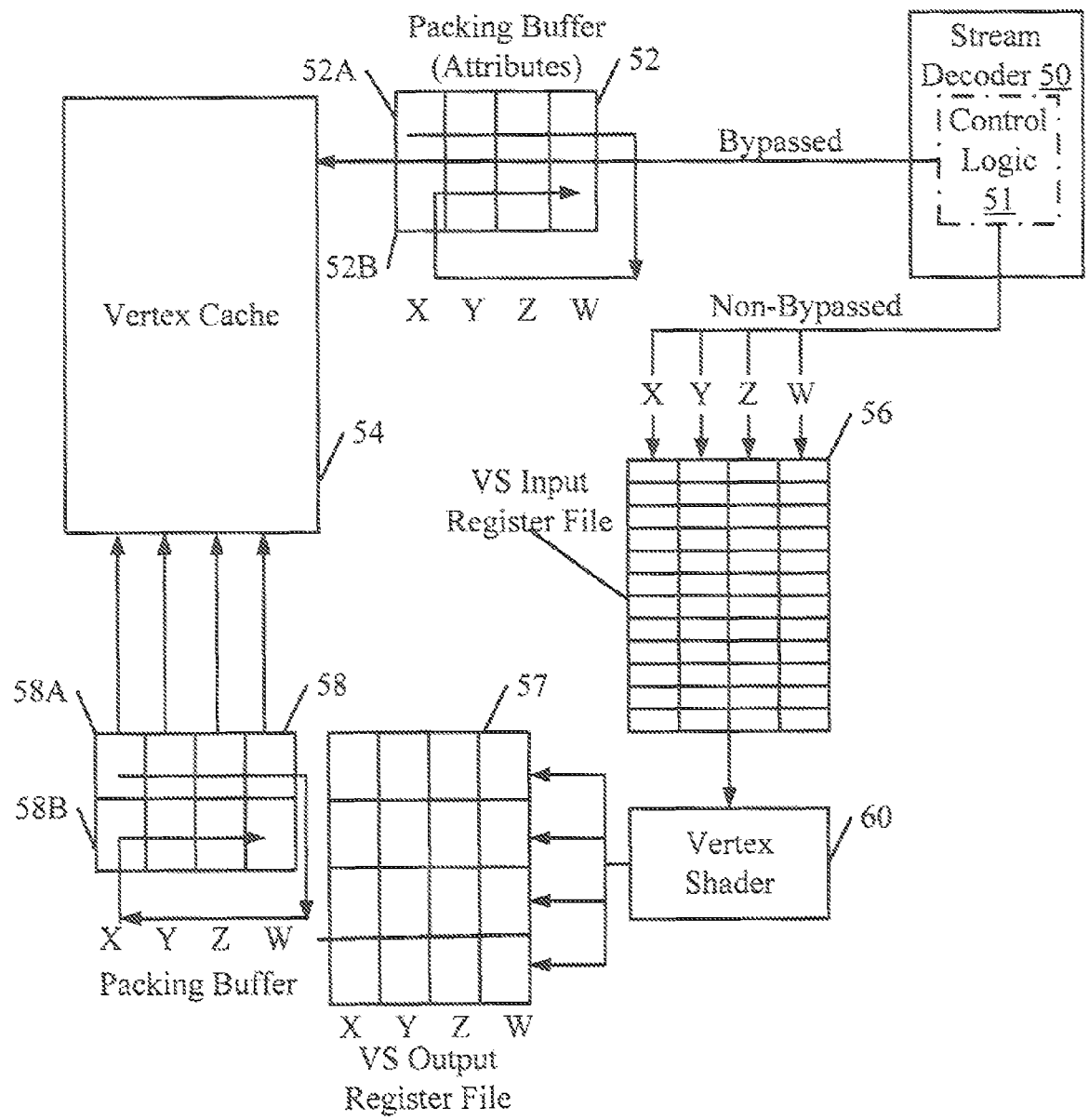
FIG. 4 shows a general block diagram of the graphic processing unit (GPU) for the vertex shader and packing operations.

FIG. 4 shows a general block diagram of the graphic processing unit (GPU) 34 for the vertex shader and packing operations. The GPU 34 includes a stream decoder 50 which outputs a plurality of attributes to a VS input register file 56. These attributes are accepted by the Vertex Shader (VS) 60. The output of the VS 60 includes varyings which are stored in the VS output register file 57. As can be appreciated, the "register" file is a hardware component such as a storage medium to store information. In this instance, the "VS input register file" stores an input file to be sent to the VS 60. For simplicity, in most instances, when referring to the VS input register file 56 the "input file" to the VS 60 and/or the hardware for storing the "input file" are being referenced. Likewise, for simplicity, in most instances, when referring to the VS output register file 57 the "output file" from the VS 60 and/or the hardware for storing the "output file" are being referenced. As will be described in more detail later, these varyings are intelligently packed by compiler 62 (FIG. 6) for a first-level varying packing. The varyings in the VS output register file 57 are sent to packing buffer 58 continuously in series or a chain sequence which packs the varyings in a second-level varying packing. As the packing buffer 58 fills, the packed varyings are then stored in a vertex cache 54.

As will be seen from the description below, the VS output register file 57 and the VS input register file 56 each include a plurality of shared M-dimensional (MD) registers. Each of the packing buffers 58 and 52 includes at least one shared M-dimensional (MD) register.

In the configuration of FIG. 4, the stream decoder 50 generates two streams, a bypassed stream and a non-bypassed stream. The non-bypassed stream is sent to the VS input register file 56 and preferably is also packed in the manner shown in Table 1. The bypassed attributes are packed in packing buffer 52. The bypassed attributes will be described in detail later in relation to FIGS. 8A, 8B, 9A, 9B, 10A, 10B, 11A, 11B, 12A and 12B.

Figure 5:
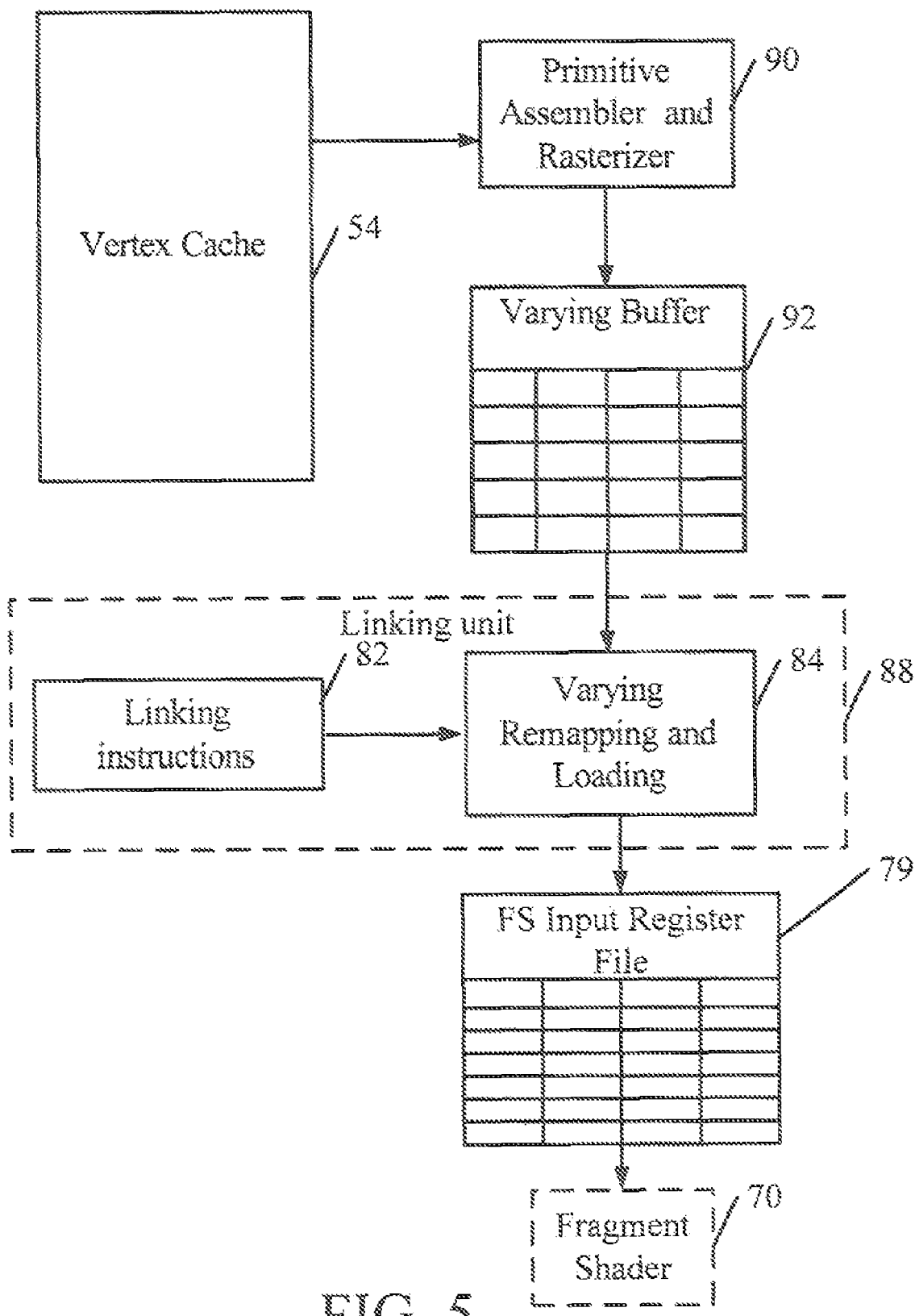
FIG. 5 shows a general block diagram of the graphic processing unit (GPU) with the fragment shader and linking operations.

FIG. 5 shows a general block diagram of the graphic processing unit (GPU) with the fragment shader and linking operations. The packed varyings are stored in the vertex cache 54. The primitive assembler and rasterizer 90 accept as inputs the varyings in the vertex cache 54. The primitive assembler and rasterizer 90 output the packed varyings into a varying buffer 92. A linking unit 88 has a set of linking instructions 82 that are used by a varying re-mapping and loading module 84. The linker 80 in FIG. 6 generates a linking table 86 which is loaded into storage for the linking instructions 82 in FIG. 5 by driver 61. An example of a linking table 86 is shown in Tables 4 and 6 set forth below which links the packed varyings in the VS output symbol table (Table 2) to a FS input symbol table (Table 3). The FS input symbol table may have less symbols than the VS output symbol table. After the linking process is performed by linking unit 88, the varyings from the varying re-mapping and loading module 84 sent to the FS input register file 79 for use by the fragment shader (FS) 70.

Figure 6:
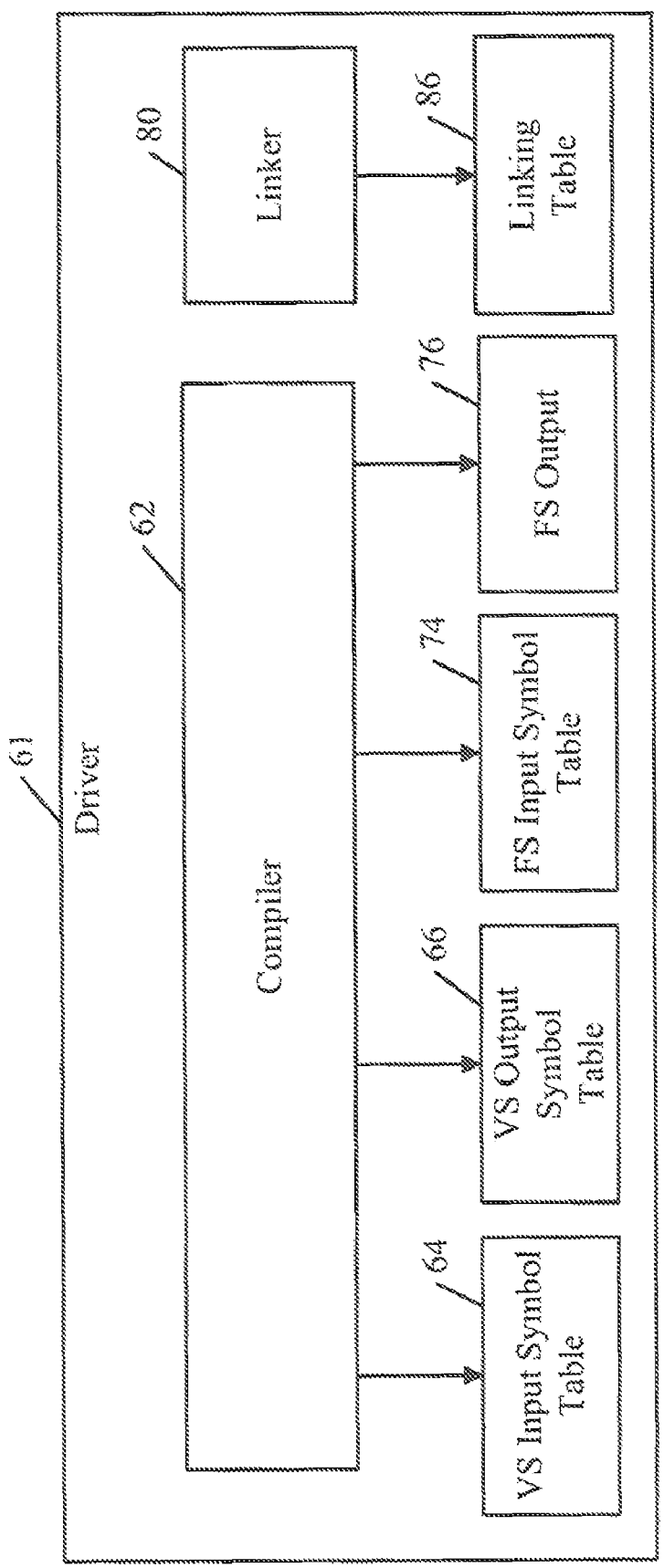
FIG. 6 shows a general block diagram of a driver.

FIG. 6 shows a general block diagram of a driver. The driver 61 includes a compiler 62 and linker 80. The compiler 62 generates a VS input symbol table 64 and a VS output symbol table 66. An exemplary VS input symbol table is shown below in Table 1. An exemplary VS output symbol table is shown below in Table 2. The compiler 62 may assign the same symbol an ID in the VS output symbol table 66 different from one in the FS input symbol table 74 because the compiler 62 may compile the vertex shader 60 and a fragment shader 70 independently. Thus, there is a linker 80 for the driver 61 to do mapping between the register IDs in the VS output symbol table 66 and the register IDs in the FS input symbol table 74 by looking for the same symbol in both tables. The linker 80 communicates to the GPU 34 to load a varying (corresponding to a location in vertex cache 54 or varying buffer 92) to a corresponding input register in an input register file 79 of the fragment shader 70 for the same varying symbol.

The driver 61 is a software driver having a set of instructions. The compiler 62 and linker 80 are parts of the software driver 61 running on a CPU 32 or controller/processor 26, while the GPU 34 is special co-processor instructed by the driver 61.

The VS input symbol table, shown in Table 1, includes the following entries: Attribute name, Type, Originally Assigned Attribute Input Register ID, Original Mask, Newly Assigned Attribute Input Register ID and New Mask. The VS output symbol table, shown in Table 2, includes the following entries: Varying name, Type, Originally Assigned Varying Output Register ID, Original Mask, Newly Assigned Varying Output Register ID and New Mask. The Mask in the tables represent valid components for attribute vectors or varying vectors, corresponding to a default MD (M=4) vector register storage allocated in the hardware (HW) of the GPU 34. Both the Originally Assigned IDs and Mask, and the Newly Assigned IDs and Mask are put together in the tables below just for illustration. Actually, the Originally Assigned IDs and Mask may be a temporary result and will become the Newly Assigned ID and Mask by using the same storage location during operations.

Figure 2:
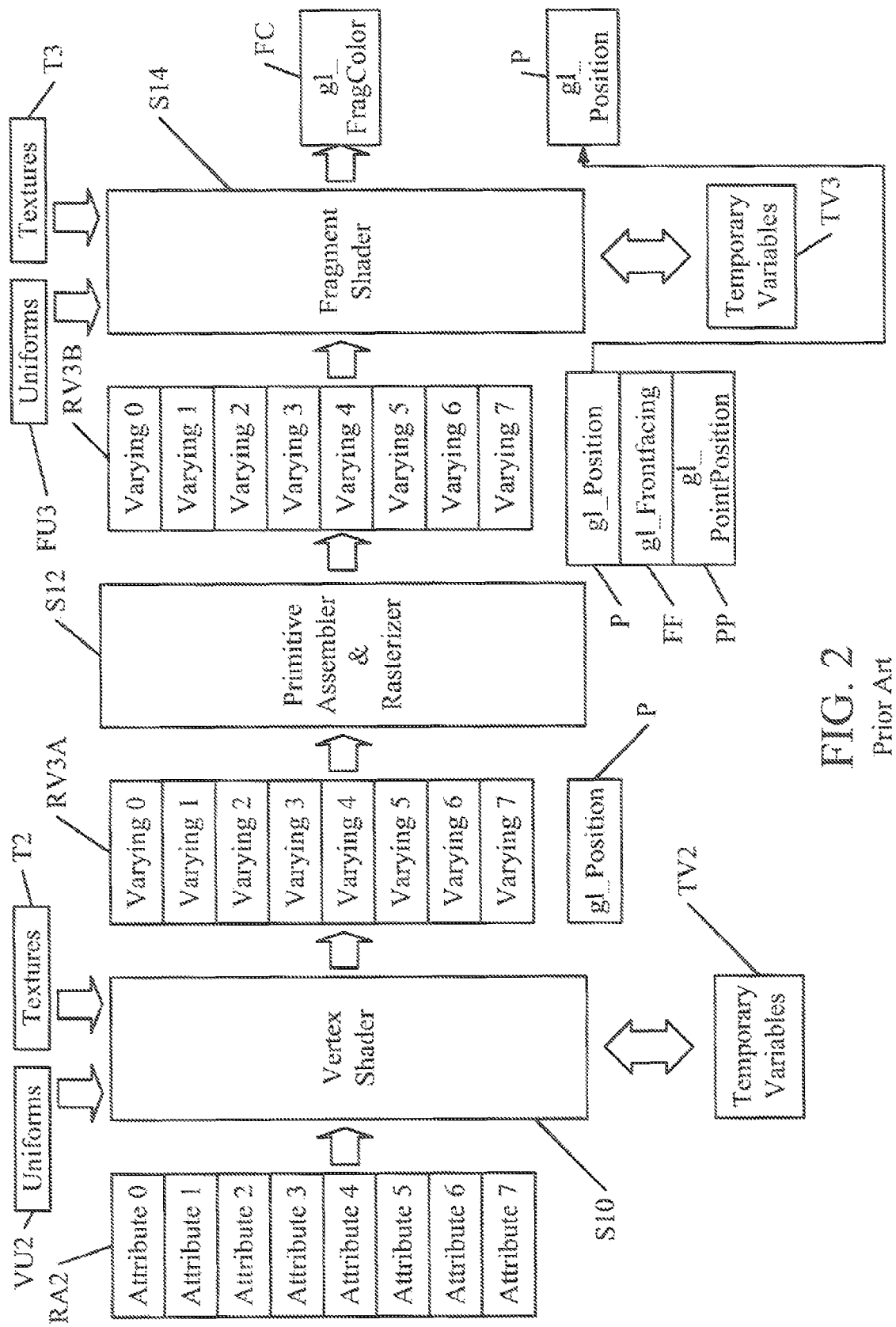
FIG. 2 shows a general block diagram of the conventional pipeline stages with shaders.

The compiler 62 generates a FS input symbol table 74 and a FS output 76 denoted as g1_FragColor FC (FIG. 2). The FS input symbol table 74, shown in Table 3, includes the following entries: Varying name, Type, Originally Assigned Varying Input Register ID, Original Mask, Newly Assigned Varying Input Register ID and New Mask.

In Tables 1 and 2 below, the last two columns are newly updated according to the packing process described later.

TABLE 1

VS input symbol table

| Attribute name | Type | Originally Assigned Attribute Input Register ID | Original mask | Newly Assigned Attribute Input Register ID | New mask |
|---|---|---|---|---|---|
| position0 | Float vector4 | 0 | 1111 | 0 | 1111 |
| position1 | Float vector3 | 1 | 0111 | 1 | 0111 |
| Weight | Float | 5 | 0001 | 2 | 1000 |
| Normal | Short float vector3 | 2 | 0111 | 2 | 0111 |
| Texcoord0 | Float vector2 | 3 | 0011 | 3 | 0011 |
| Texcoord1 | Float vector2 | 4 | 0011 | 3 | 1100 |

TABLE 2

VS output Symbol Table

| Varying Name | Type | Originally Assigned Varying Output Register ID | Original Mask | Newly Assigned Varying Output Register ID | New Mask |
|---|---|---|---|---|---|
| position | Float vector4 | 1 | 1111 | 1 | 1111 |
| color0 | Float vector4 | 2 | 1111 | 2 | 1111 |
| color1 | Float vector3 | 3 | 0111 | 3 | 0111 |
| Texcoord0 | Float vector2 | 0 | 0011 | 0 | 0011 |
| Texcoord1 | Float vector2 | 5 | 0011 | 0 | 1100 |
| Texcoord2 | Float vector3 | 4 | 0111 | 4 | 0111 |

TABLE 3

FS Input Symbol Table

| Varying Name | Type | Originally Assigned Varying Input Register ID | Original mask | Newly Assigned Varying input Register ID | New mask |
|---|---|---|---|---|---|
| Color0 | Float vector4 | 0 | 1111 | 2 | 1111 |
| Color1 | Float vector3 | 1 | 0111 | 0 | 0111 |
| texcoord0 | Float vector2 | 3 | 0011 | 1 | 0011 |
| texcoord1 | Float vector2 | 2 | 0011 | 1 | 1100 |

TABLE 4

Link Table for VS outputs and FS inputs

| Varying name | Originally Assigned VS Varying Output Register ID | Originally Assigned FS Varying input Register ID | Original mask | Newly Assigned VS Varying Output Register ID | Newly Assigned FS Varying Input Register ID | New mask |
|---|---|---|---|---|---|---|
| Position | 1 | | | 1 | | |
| color0 | 2 | 2 | 1111 | 2 | 2 | 1111 |
| color1 | 3 | 3 | 0111 | 3 | 0 | 0111 |
| Texcoord0 | 0 | 1 | 0011 | 0 | 1 | 0011 |
| Texcoord1 | 5 | 1 | 1100 | 0 | 1 | 1100 |
| Texcoord2 | 4 | | | 4 | | |

The varyings may be floats, two-dimensional (2D) vectors, three-dimensional (3D) vectors, four-dimensional (4D) vectors, array and 2D/3D/4D matrix, etc. The OpenGL ES shading language specification requires at least 32 varying components to be supported in a mobile GPU 34. Every varying has a different size and usually takes its own register/buffer space. In a vertex cache 54, a register is usually a 4D vector. Additionally, the registers corresponding to the VS input register file 56 and the registers corresponding to the VS output register file 57 are usually a 4D vector. Varying packing puts different varyings tightly together in a continuous space for each vertex or pixel. For example, the varying packing described herein puts two 2D vectors into a 4D vector register. In another example, the varying packing will put a 3D vector and a float (1D) into a 4D vector register. Without packing them tightly, they may be stored loosely.

The above description relates to varyings. However, in addition to varyings, attributes may also be packed.

Figure 7:
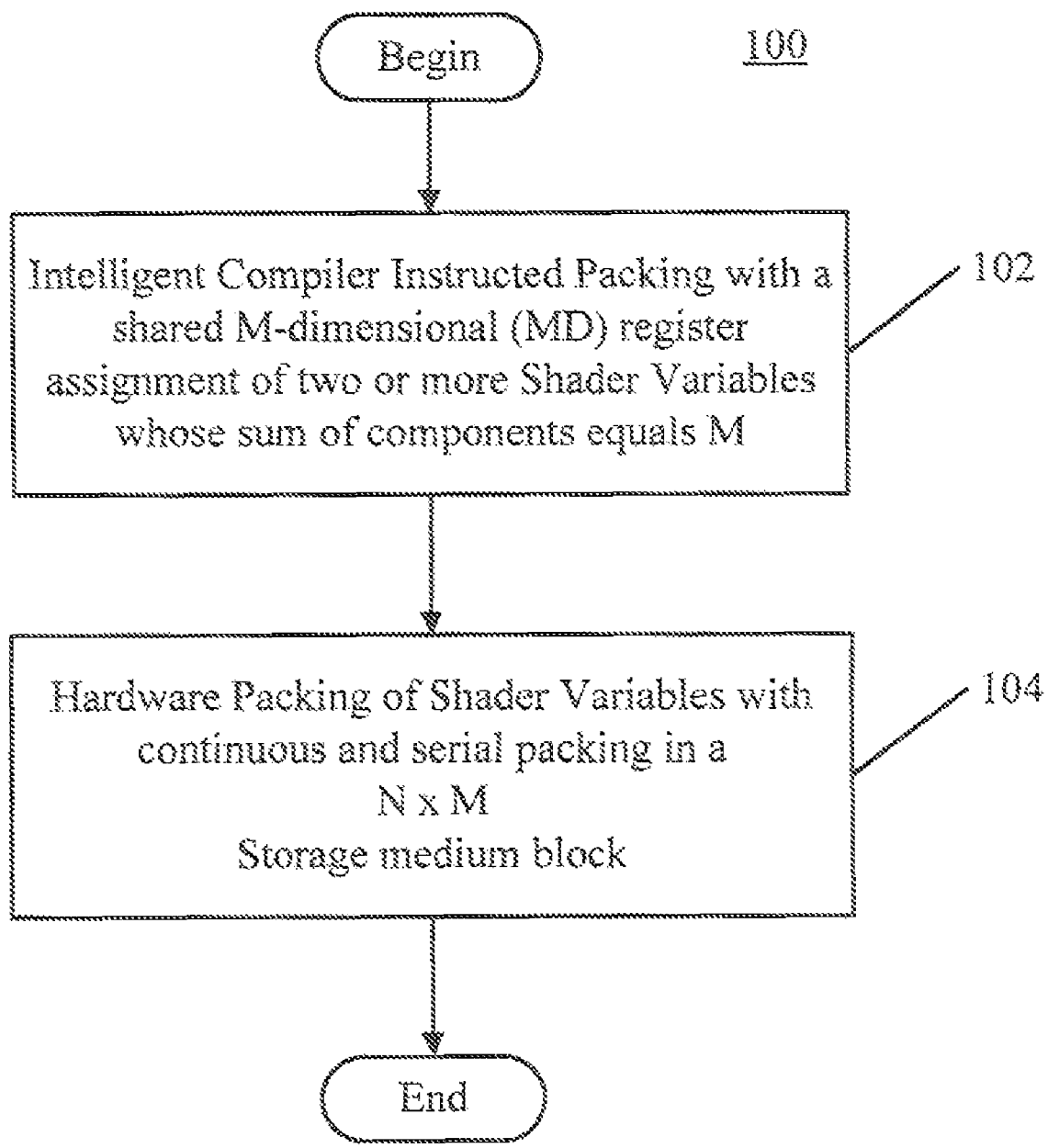
FIG. 7 shows a general flowchart of the two-level shader variables packing process.

FIG. 7 shows a general flowchart of the two-level shader variables packing process 100. The process 100 begins at block 102 where an intelligent packing instructed by the compiler 62 takes place. At block 102, two or more shader variables whose sum of components equals M are assigned to a shared M-dimensional (MD) vector register. To permit illustration, the VS output register file 57 is shown with columns and rows. Each row has four (4) blocks denoted as X, Y, Z and W. Block 102 is followed by block 104 where hardware varying packing takes place in a packing buffer 58 which packs the shader variables in the VS output register file 57 consecutively and in series in a N×M storage medium block of the vertex cache 54. The shader variables of FIG. 7 are varyings.

As will be seen from the description below, bypassed attributes are packed in the packing buffer 52 similar to the process of block 104 described in relation to FIG. 13A. The non-bypassed attributes may be packed using the process described above in relation to block 102. Thus, stages of the packing process 100 may be used for attributes. Therefore, shader variables include varyings or attributes.

First Level: Compiler Level Packing

The following description of the intelligent packing at block 102 which is instructed by the compiler 62 will be described in relation to Tables 1 and 2 above. The intelligent packing applies to shader variables (both the varyings and attributes). Table 1 is illustrative of the attribute packing and Table 2 is illustrative of the varying packing. The compiler 62 performs the non-bypassed attributes or varying packing by re-assigning a same or common MD (M-dimensional) vector register, having associated therewith a register ID, to two or more varyings whose sum of components equals M (M=4) and updates a mask, accordingly. The MD vector register for attributes corresponds to the storage for the VS input register file 56 in FIG. 4. The MD vector register for varyings corresponds to the storage for the VS output register file 57 in FIG. 4. In the exemplary configuration M=4, thus the vectors are denoted as X, Y, Z and W. Nevertheless, other configurations with more or less dimensions may be used.

The mask has M-bit locations. Thus, the mask associated with each re-assigning and/or combined attributes or varyings (shader variables) for a particular MD vector register is used to designate or distinguish which portion of the shared MD vector register is assigned to each distinct attribute or varying (of the combination) for later recall and use.

For example, with specific reference to Table 1 above, texcoord0 and texcoord1 were originally assigned different attribute input registers denoted by the ID numbers 3 and 4, respectively, in the column Originally Assigned Attribute Input Register ID. Furthermore, the original masks for texcoord0 and texcoord1 are 0011 and 0011, respectively. The compiler 62 determines that both texcoord0 and texcoord1 are 2D vectors whose sum of the vectors equals 4D (M=4) vectors. Hence, the compiler 62 instructs the packing of texcoord0 and texcoord1 into the same attribute register denoted by the ID number 3 in the column Newly Assigned Attribute Input Register ID. During packing, texcoord0 can be assigned the lowest significant bit locations 0011 of the mask and texcoord1 can be assigned the most significant bit locations 1100 of the mask denoted in the New Mask column in Table 1. The mask 0011 designates which part of the MD vector register 3 the data corresponding to texcoord0 can be found. Likewise, the mask 1100 designates which part of the MD vector register 3 the data corresponding to texcoord1 can be found. This nomenclature allows two or more attributes to share a common register in a non-overlapping manner. As can be appreciated, the number of bits in the mask will vary depending on the dimensions.

With specific reference to the varyings texcoord0 and texcoord1 of the VS output symbol table 66, they are packed into the same varying register having an ID number 0 denoted in the column Newly Assigned Varying Register Output ID, as best seen in Table 2. The new mask for texcoord0 is 0011 which is the same as the old mask. However, the new mask for texcoord1 is 1100 which is different from the old mask. Thus, the mask has M-bits, each bit representing a location in the shared MD vector register.

In another example, the attributes Weight and Normal of the VS input symbol table 64 are packed into the same attribute register having an ID number 2 denoted in the Newly Assigned Attribute Input Register ID of Table 1. After the compiler 62 instructs the re-assignment of the register IDs and New Masks, the hardware (HW) of the GPU 34 will automatically load corresponding shader variables (attributes or varyings) into the assigned registers according to the table like instructions (with updated masks) which completes the first-level packing instructed by the compiler 62.

An array or matrix can be logically split to 2D/3D/4D vector or single float, then packing as instructed by the compiler 62 can be performed. An array can be represented by a series of floats, 2D vectors, 3D vectors or 4D vectors. For example, array of 10 floats can be split to two 4D vectors plus one 2D vector, or 10 individual floats. A matrix 2×2 can be split to two 2D vectors, matrix 3×3 to three 3D vectors and matrix 4×4 to four 4D vectors, respectively. Hence, the compiler 62 can instruct the packing for the following cases: 2D vector+2D vector; 3D vector+float; 2D vector+float [+float]; and Float+float [+float [+float]]. These examples are for a 4D vector register. Other combinations are envisioned based on the number of dimensions. The usage of input register file and output register file can be minimized by the first level packing.

After the packing as instructed by the compiler 62, all shader variables (varyings) may still not be arranged in 4D (MD) vectors, for instance, some 3D vectors, some 4D vectors, etc., may be present. In the exemplary configuration, a mechanism for HW packing varyings tightly in the varying storage or vertex cache 54 for a second-level of varying packing is performed.

Second Level: HW Packing

In varying storage or vertex cache 54, all varyings for a vertex or a pixel are stored in a N×M buffer block. N is the number of varyings; M=4 means 4D vectors. The storage block can be treated as a number (N×M) of continuous (consecutive) components. For 32bits/components and M=4, the components may be numbered with 0~((N×4)−1). For instance, N=8, 8×4 storage medium block can be treated as 32 continuous (consecutive) components, numbered with 0~31.

In FIG. 4, the packing buffer 58 is represented as a 2×M (M=4) array of slots. The arrows indicate the direction of filling the slots in the packing buffer 58. The top row of packing buffer 58 is denoted as a temp buffer 58A while the second row is denoted as a working buffer 58B. Table 5 illustrates the HW packing results.

TABLE 5

Packing When Transferring from VS output register file to Varying Storage or Vertex Cache

| VS output register file | | | | packing | Varying storage or Vertex cache | | | |
|---|---|---|---|---|---|---|---|---|
| V0.x | V0.y | V0.z | | → | 0: V0.x | 1: V0.y | 2: V0.z | 3: V1.x |
| V1.x | V1.y | V1.z | V1.w | | 4: V1.y | 5: V1.z | 6: V1.w | 7: V2.x |
| V2.x | V2.y | | | | 8: V2.y | 9: V3.x | 10: V3.y | 11: V3.z |
| V3.x | V3.y | V3.z | | | 12: V4.y | 13: V5.y | 14: V5.z | 15: V5.w |
| | V4.y | | | | 16: V6.x | 17: V6.y | 18: V6.z | 19: V6.w |
| | V5.y | V5.z | V5.w | | 20: V7.x | 21: V7.y | 22: V7.z | |
| V6.x | V6.y | V6.z | V76.w | | | | | |
| V7.x | V7.y | V7.z | | | | | | |

The second-level packing can be done in HW by first filling consecutively in series a temp buffer 58A (first row of packing buffer 58). After the temp buffer 58A of packing buffer 58 is full, the contents of the temp buffer 58A can be transferred for storage in the vertex cache 54. In this configuration, the packing buffer 58 includes a first row of M slots designated as the temp buffer 58A and a second row of M slots designed as a working buffer.

Using the example set forth in Table 5, the HW packing begins with reading the varying V0 having three components denoted as V0.x, V0.y and V0.z from the VS output register file 57 and filling the temp buffer 58A (upper row) slots X, Y, Z and W consecutively with the varyings V0.x, V0.y and V0.z. As can be seen, the slot W of the temp buffer 58A is free. The varyings V0.x, V0.y and V0.z are not yet sent to the vertex cache 54 until the temp buffer 58A is full.

The HW packing continues by reading varying V1 having four components denoted as V1.x, V1.y, V1.z and V1.w from the VS output register file 57 and filling the remaining slot(s) in the temp buffer 58A. In this case, slot W of the temp buffer 58A (upper row) is filled with the varying V1.x. The remaining varying components V1.y, V1.z and V1.w are filled consecutively in slots X, Y, and Z of the second row or working buffer 58B. As the temp buffer 58A is completely filled, the contents of the temp buffer 58A can be written into a (first) row of the vertex cache 54 to empty the temp buffer 58A.

If the temp buffer 58A is empty, the contents of the remaining varying components V1.y, V1.z and V1.w filled consecutively in slots X, Y, and Z of the working buffer 58B are transferred to temp buffer 58A. Again, the temp buffer 58A is not full. Thus, the HW packing continues by reading varying V2 having two components denoted as V2.x and V2.y from the VS output register file 57 and filling the remaining slot(s) in the temp buffer 58A. In this case, slot W of the temp buffer 58A (upper row) is filled with the varying V2.x. The remaining varying component V2.y is filled in slot X of the second row or working buffer 58B. When the temp buffer 58A is completely filled, the contents of the temp buffer 58A can be written into a (second) row of the vertex cache 54 to empty the temp buffer 58A.

This process continues for the varyings in VS output register file 57. In the example, because the last varying fills only the X, Y and Z slots of the temp buffer 58A, the contents is written to the varying storage or vertex cache 54 with a mask=xyz or (111).

The temp buffer 58A and working buffer 58B of the packing buffers 58 are for performance. When the temp buffer 58A is full and ready to write out to varying storage or vertex cache 54, the other buffer (working buffer 58B) can be simultaneously filled. Both a read bus and a write bus can be used for four (M) components at a time. If one read or write data is less than 4 components, read or write mask is used to indicate which components are valid to be read or written.

After the second-level HW packing is complete, the register ID corresponding to the Newly Assigned VS Varying Output Register ID in Table 4 corresponding to the packed varyings in the VS output symbol table (Table 2) will be changed to correspond to the varying storage or vertex cache 54 denoted in the column Newly Assigned VS Varying Output Register ID in Table 6. For simplicity and flexibility, the output ID relation to a location in vertex cache 54 is assigned based on a unit of component instead of a vector register. For this example, it is assumed that texcoord0, whose ID=0, and texcoord1, whose ID=2, are packed into first row of varying storage or vertex cache 54, color0, whose ID=4, to a second row and color1, whose ID=8, to a third row. Position and texcoord2 are not used in FS 70 thus no storage/packing is allocated for them in the FS input register file 79. Thus, a Newly Assigned FS Varying Input Register ID is not provided in Table 4 or Table 6.

The second-level HW packing is done by the HW but the link table 86, such as shown in Table 6, is updated by the linker 80 of the driver 61. The driver 61 is able to compute new register ID/component ID in varying storage or vertex cache 54 for each varying component based on the same packing mechanism and VS input and output symbol tables 64 and 66 and FS input symbol table 74, etc. in FIG. 4. Table 4 illustrates what a linking table would represent without the second-level HW packing. Table 6 illustrates what a linking table would represent after the HW packing.

TABLE 6

Link Table for VS outputs and
FS inputs after second level HW packing

| Varying name | Newly Assigned VS (varying) output ID | Newly Assigned FS (varying) input ID | New mask |
|---|---|---|---|
| Position | | | |
| color0 | 4 | 2 | 1111 |
| color1 | 8 | 3 | 0111 |
| Texcoord0 | 0 | 1 | 0011 |
| Texcoord1 | 2 | 1 | 1100 |
| Texcoord2 | | | |

Bypassing Attributes

A programmable vertex shader, such as VS 60, is a key computation unit in the modern GPU in both PC gaming devices and mobile devices. The VS 60 is computationally power consuming and usually a performance bottleneck as well. However, some applications may not use the shader functionality. Another consideration is that some inputs to the VS 60 may be directly moved to outputs without any need for computations.

The simplest solution for the functions is to pass all inputs into the vertex shader where the vertex shader executes move instructions. However, such a solution will consume lots of computation power and cause the vertex shader to have a decrease in performance. The performance drop is the result of 1) unnecessary traffic bandwidth for data inputs/outputs; and 2) unnecessary move instructions executed in the vertex shader.

Thus, the GPU 34 is constructed and arranged with an input bypassing path from input stream decoder 50. The input bypassing path may go directly to vertex cache 54. The driver 61 or compiler 62 can specify which inputs can be directly bypassed to the vertex cache 54 and which inputs should be loaded into the vertex shader 60. The compiler 62 will remove all unnecessary move instructions from the shader program for bypassed inputs.

A small hardware control logic 51, shown in phantom in FIG. 4, is in the input stream decoder 50. Thus, when a received input is specified as "bypass," after input format decoding, the input will be sent along the bypassed path and stored in the vertex cache 54. Only the received inputs which are not denoted as "bypass" will be packed in the VS input register file 56 and sent to the vertex shader 60.

In the exemplary embodiment, the bypassed attributes are packed in packing buffer 52 prior to storage in the vertex cache 54. The compiler 62 will modify the mask and/or register ID in the manner as described above in relation to packing buffer 58A. a cache index will be passed to the vertex cache 54 along with the bypassed inputs. The outputs from the vertex shader 60 will have the same ID/index for the same vertex, thus the vertex cache 54 can easily sync the bypassed inputs with the vertex shader outputs.

FIGS. 8A and 8B show a vertex shader program before and after bypassing attributes are removed. Some vertex shaders have MOV instructions on lines denoted by L3 and L4. The MOV instructions cause movement from input registers associated with attributes to output registers associated with varyings. Such attributes can be bypassed from the vertex shader 60. For example, in FIG. 8A, the parameters v0, v1, v2 are input attributes and oPos, oFog, oT0 and oD0 are output varyings. In this example, the input attribute v1 on line L1 and L3 and input attribute v2 on lines L2 and L4 do not involve any computations in the vertex shader 60 and are only moved to oT0 and oD0. The attributes v1 and v2 can therefore be bypassed directly to varying storage or vertex cache 54 before the program (set of instructions) of the vertex shader 60 is executed. After the attributes v1 and v2 are bypassed, they will not be sent into vertex shader 60 denoted by the deletion of lines L1, L2, L3 and L4 in FIG. 8B. Additionally, the output varyings oT0 and oD0 are not output from vertex shader 60 denoted by the absence of lines L3 and L4 in FIG. 8B. Therefore, the bypassing function saves traffic bandwidth and vertex shader computation power.

For attribute bypassing, the second-level HW packing is adjusted as described below. The bypassed attributes are subjected to second-level HW packing only in the packing buffer 52. The packing buffer 52 receives the bypassed attributes from the stream decoder 50. The stream decoder 50 is responsible for vertex stream (attributes) fetching from main (external) memory 40 and format conversions from different attribute formats to IEEE float format. The driver 61 will communicate to the stream decoder 50 which attributes will be bypassed and which attributes will be sent to VS input register file 56 for the vertex shader 60. The bypassed attributes will be packed in the same way as described above using the temp buffer 58A and working buffer 58B above. The non-bypassed attributes will be sent to and packed in the VS input register file 56 of vertex shader 60.

The varyings from both bypassed attributes and VS output register file 57 will fill in the whole varying storage or vertex cache 54 as a whole varying footprint. For simplification, varyings from the bypassed attributes are packed and stored in the first few rows in varying storage or vertex cache 54 and the VS outputs packed in the packing buffer 58 are stored thereafter in the varying storage or vertex cache 54. For example, with reference again to FIG. 8A the varying output (bypassed attribute) oD0 (v2) is packed in the temp buffer 52A of the packing buffer 52 and stored in a first row in the varying storage or vertex cache 54. The varying output (bypassed attribute) oT0 (v1) is packed or stored in two low significant components in a second row in varying storage or vertex cache 54. The VS outputs oPos and oFog will be packed or stored thereafter starting from two most significant components of a second row. In this case, oPos.xy will be packed at the temp buffer's zw slots and then written to a second row of varying storage or vertex cache 54 with a write mask=zw. Thus it is packed consecutively after oT0 in the same row but at different component locations. The oPos.zw and oFog will be packed in working buffer 52B at the xyz component slots and written to a third row of varying storage or vertex cache with a write mask=xyz. The link table 86 will be updated accordingly.

FIG. 9A and 9B show another vertex shader program before and after bypassing attributes are removed. The move instructions on lines denoted by Arrows L5, L6, L7, L8 and L9 may be bypassed. For example, on the line denoted by Arrow L5, the varying output oT0 (v1) can be bypassed. The other varying outputs oT1 (v1), oT2 (v3), oD0 (v4) and oD1 (v5) may also be bypassed. In FIG. 9B, the lines denoted by Arrows L5, L6, L7, L8 and L9 of FIG. 9A are removed.

FIGS. 10A and 10B show a still further vertex shader program before and after bypassing attributes are removed. The move instructions on lines denoted by Arrows L10 and L11 may be bypassed. In FIG. 10B, the lines denoted by Arrows L10 and L11 in FIG. 10A are removed.

FIGS. 11A and 11B show a still further vertex shader program before and after bypassing attributes are removed. The move instructions on lines denoted by Arrows L12, L13, L14, L15 and L16 may be bypassed. In FIG. 11B, the lines denoted by Arrows L12, L13, L14, L15 and L16 of FIG. 11A are removed.

FIGS. 12A and 12B show a still further vertex shader program before and after bypassing attributes are removed. The move instructions on lines denoted by Arrows L17 and L18 may be bypassed. In FIG. 12B, the lines denoted by Arrows L17 and L18 of FIG. 12A are removed. The examples shown in FIGS. 8A, 8B, 9A, 9B, 10A, 10B, 11A, 11B, 12A and 12B are for illustrative purposes and other move instructions or attributes not requiring calculations may be designated as "bypass attributes."

As can be readily seen, the advantages of the bypassing attributes process includes: 1) a reduction in shader code size and executing instructions; 2) a reduction in traffic bandwidth of inputs/outputs; 3) a reduction in the register file size to allow more vertices to cover ALU (arithmetic and logic unit) latency and texture loading latency; 4) better performance due to less instructions and more vertices to cover latency; 5) power savings due to less instructions executed and less traffic; 6) generic for shader bypass/disable; 7) an option for the driver 61 to tune the performance by moving a part of the shader program to the CPU or the DSP for load balancing between CPU/DSP 32 and GPU 34; and 8) an option for the driver 61 to work around unexpected issues.

It has been determined that most of the vertex shaders (VS) from real games and benchmarks have some inputs moved directly to outputs. Table 7 illustrates different shader programs and a comparison of the saved input traffic and saved output traffic based on the bypassed function described herein. The Table 7 also provides the ratio of saved instructions.

TABLE 7

| Traffic bandwidth and computation saving | | | |
| --- | --- | --- | --- |
| Shaders | Saved input traffic (DW) | Saved output traffic (DW) | Saved Instructions (scalar) |
| VSF8 (3DMark06) (FIGS. 12A and 12B) | 4/17 = 23.5% | 4/27 = 14.8% | 4/97 = 4.1% |
| VSF12 (FarCry) (FIGS. 8A and 8B) | 6/10 = 60% | 6/11 = 54.5% | 4/28 = 14.3% |
| VSF14 (FarCry) (FIGS. 9A and 9B) | 13/21 = 61.9% | 15/20 = 75% | 15/70 = 21.4% |
| VSF17 (FarCry) (FIGS. 10A and 10B) | 0% | 3/7 = 42.8% | 3/19 = 16.8% |

TABLE 7-continued

| Traffic bandwidth and computation saving | | | |
| --- | --- | --- | --- |
| Shaders | Saved input traffic (DW) | Saved output traffic (DW) | Saved Instructions (scalar) |
| VSF25 (FarCry) (FIGS. 11A and 11B) | 9/13 = 69.2% | 15/21 = 71.4% | 15/61 = 24.6% |

Figure 13A:
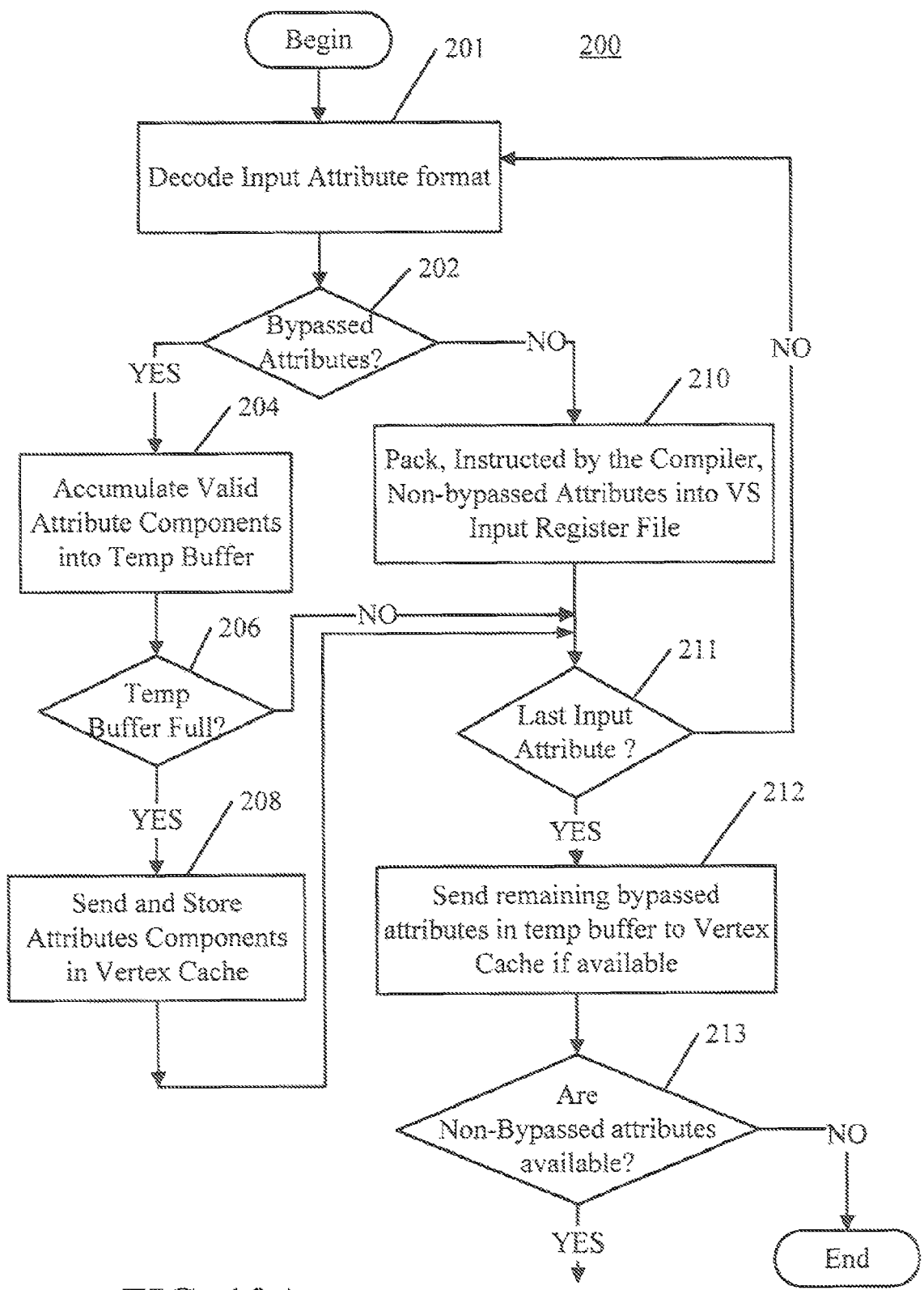
FIGS. 13A-13C show a general flowchart of a shader variables packing process combined with bypassing of attributes.
Figure 13B:
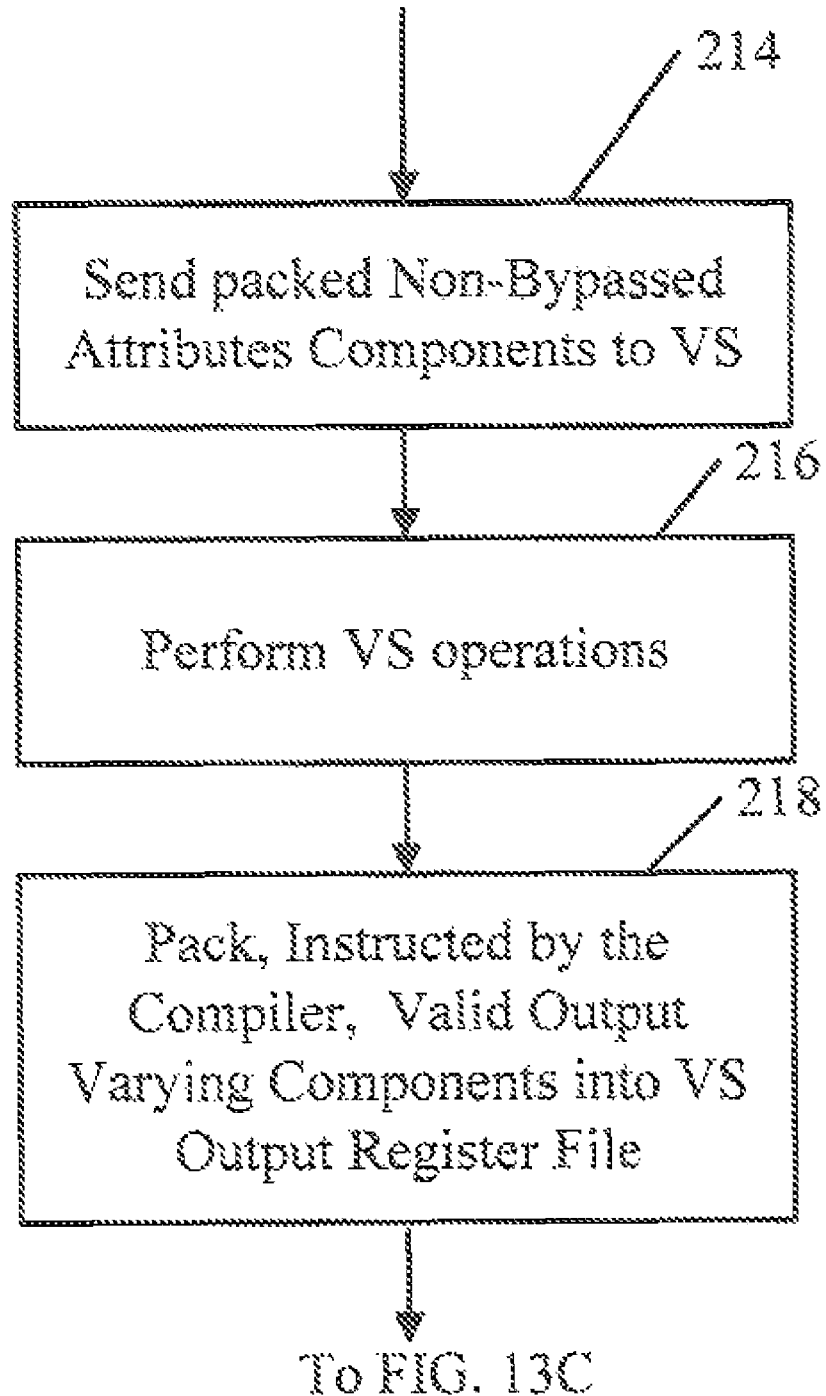
Figure 13C:
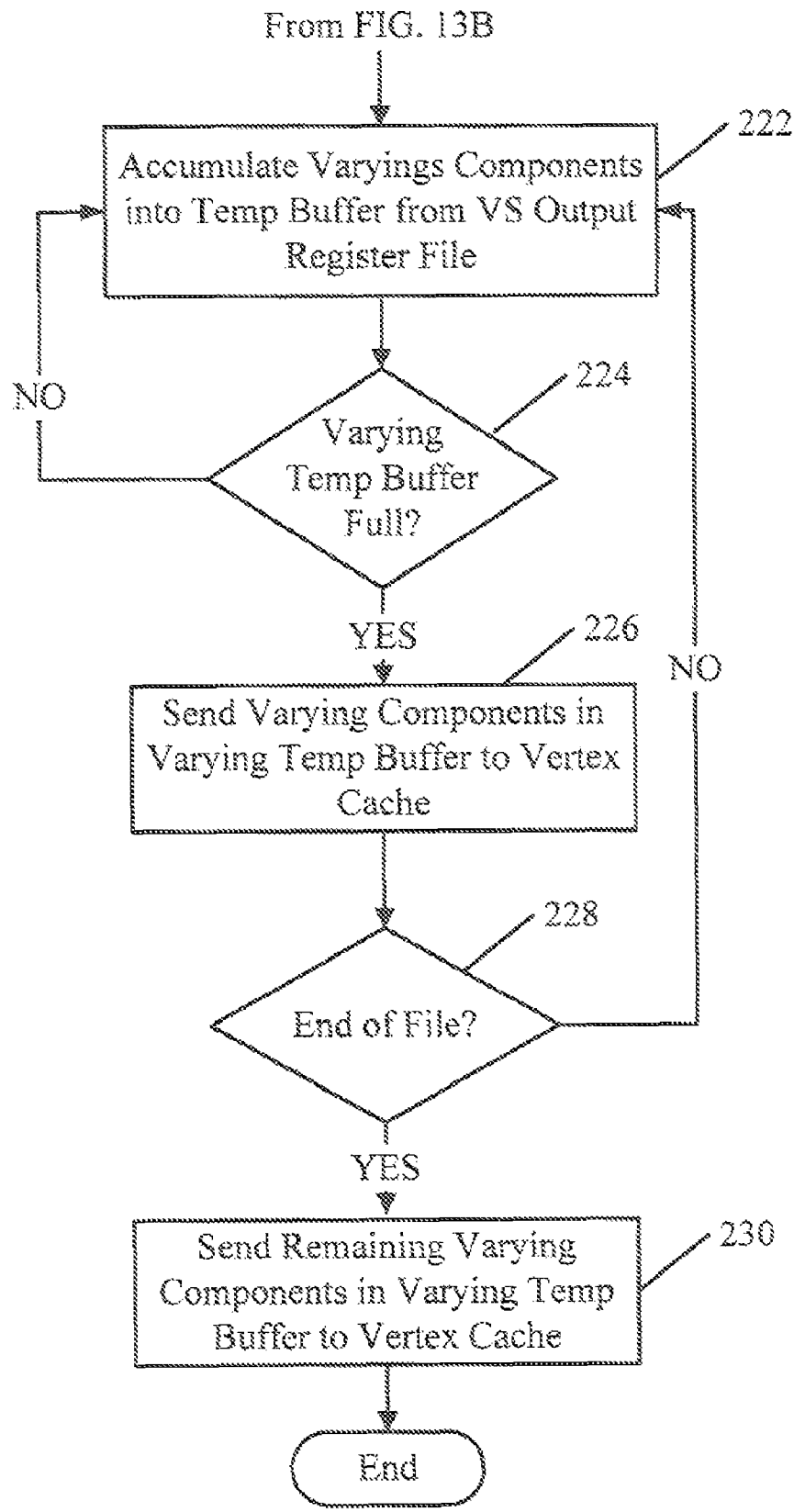

FIGS. 13A-13C show a general flowchart of a shader variables packing process 200 combined with bypassing of attributes. The shader variables packing process 200 will be described in relation to the block diagram of FIG. 4. The shader variables packing process 200 begins with block 201 where the input attribute format is decoded such as by the stream decoder 50. Block 201 is followed by block 202 where a determination is made whether the attributes from the stream decoder 50 are "bypassed attributes." If the determination is "YES," block 202 is followed by block 204 where valid (bypassed) attribute components are accumulated into a temp buffer 52A. Block 204 is followed by block 206 where a determination is made whether the temp buffer 52A is full. By way of example, a limit of M (M=4) bypassed attribute components may be filled in the temp buffer 52A. The temp buffer 52A is filled by also filling the working buffer 52B.

However, if the determination at block 206 is "NO," the process loops to block 211. Block 211 is a determination block evaluating whether the last input attribute has been reached. The details of block 211 will be described later.

When the temp buffer 52A is full, block 206 is followed by block 208 where the bypassed attribute components stored or filled in the temp buffer 52A are sent to and stored in the vertex cache 54. As described above, the bypassed attributes in the working buffer 52B are then transferred to the temp buffer 52A until filled or repopulated. Block 208 is followed by block 211 to be described later.

Returning again to block 202, if the attributes are non-bypassed attributes, meaning the determination at block 202 is "NO," according to pre-defined packing instructions, the non-bypassed attributes will be packed into the VS input register file 56 at block 210. Block 210 is followed by block 211 where a determination is made whether the last input attribute has been reached. If the determination is "NO," block 211 loops back to block 201 where more input attributes are decoded. Otherwise, if the determination is "YES," block 211 is followed by block 212 where the remaining bypassed attributes in the temp buffer 52A are sent to the vertex cache 54.

Block 212 is followed by block 213 where a determination is made whether there are any Non-bypassed attributes available. If the determination is "NO," the process 200 ends. However, if the determination at block 213 is "YES," then block 213 is followed by block 214 of FIG. 13B. At block 214, the non-bypassed attributes are then sent to the VS 60. After the non-bypassed attribute components have been sent to the VS 60, the VS 60 performs vertex shading operations at block 216. After the VS 60 is done, the valid output varying components are automatically packed into the VS output register file 57 during the execution of shader instructions which completes the first-level compiler packing at block 218. The packing at block 218 corresponds to block 102 of FIG. 7.

Block 218 is followed by block 222 in FIG. 13C. The output varyings from the VS output register file 57 are accumulated in the temp buffer 58A, as described above in relation to Table 5. The temp buffer 58A is filled in combination with the working buffer 58B. Block 222 is followed by block 224 to determine if the temp buffer 58A is full. If "NO," the process returns to block 222. If the determination is "YES," block 224 is followed by block 226 where the contents of the temp buffer 58A is sent to the vertex cache 54. Block 226 is followed by block 228 where a determination is made whether it is the end of the file in the VS output register file 57. If the determination is "NO," the process returns to block 222. If the determination is "YES," block 228 is followed by block 230 where the remaining varying components in the temp buffer 58A are sent to the vertex cache 54.

After packing, the traffic bandwidth is reduced. Storage is highly utilized and also performance is improved.

Alternative packing mechanisms may be employed. For example, the varyings in the VS output register file 57 are not packed using the second-level HW packing. Instead, the file 57 is copied in the vertex cache 54 as is. In relation to Table 5, the left hand side of the Table 5 is copied to the vertex cache 54. This keeps the same layout and shape. The same packing mechanism is done after the primitive assembler and rasterizer 90 where the rasterizer results are sent to the vary buffer 92. The primitive assembler and rasterizer 90 will skip computations for invalid (mask=0) components based on masks in the Table 2 to save computations Linker & Linking The varying from the VS 60 will be inputs to the FS 70. Thus, a varying symbol for the VS 60 as generated by the compiler 62 and entered in the VS output symbol table 66. A respective input of the FS 70 is bound to a respective varying symbol output in the VS output symbol table 66 as defined by its varying symbol or a varying name. Thus, if a varying symbol denoted by the Varying name in the VS output symbol table 66 (Table 1) matches with one entry, denoted by the FS Varying name, in the FS input symbol table 74 (Table 3), the output (varying) from the VS 60 is bound to the input of the FS 70. The linker 80 determines which VS output is bound to which FS input because the order and packing in the VS 60 are usually different from the FS 70. The linker 80 is part of the driver 61 which generates the linking instructions 82 or the linking table 86 for the varying remapping and loading module 84 in FIG. 5.

A similar linking solution is applied for linking between the vertex stream decoder 50 and VS input, denoted by the VS input symbol table 64. Additionally, a linking solution is applied for linking the FS output denoted by the FS output symbol table 76 and an input of per sample operation unit. The linker 80 can be used for any two neighbor programmable processing stages.

Figure 14:
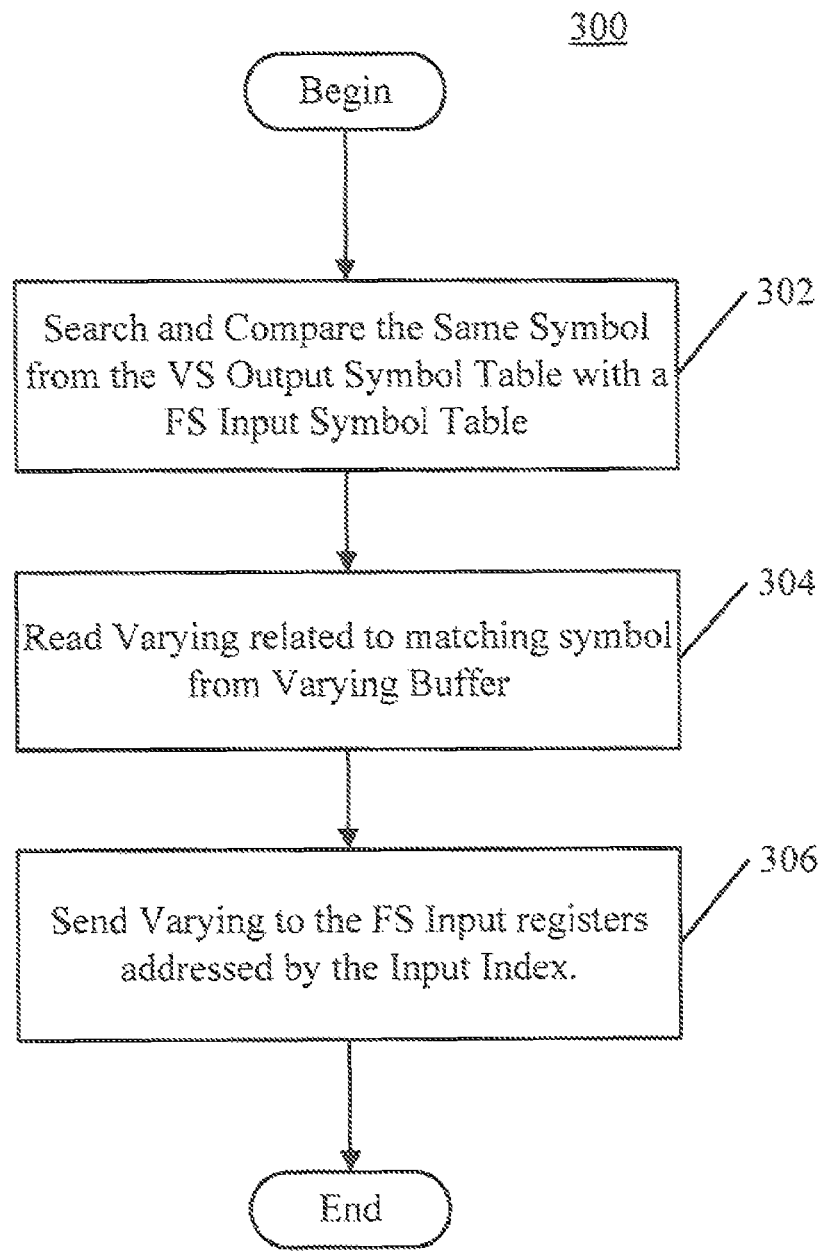
FIG. 14 shows a general flow diagram of a linking process.

FIG. 14 shows a general flow diagram of a linking process 300. The linking process 300 begins with block 302 where the linker 80 searches and compares the same symbol from both the VS output symbol table 66 and the FS input symbol table 76 at block 302. At block 304, the varying associated with the matching symbol is read from varying buffer 92. Block 206 sends the varying to the FS input register file 79. Thus linking is complete. An exemplary resultant linking table is shown in Table 6. The linking process 300 is repeated for each varying required for the FS 70.

Due to packing in the compiler 62, the VS output symbol table 66 is different from the FS input symbol table 76. Thus, the preferred linking instruction is defined on a per varying component basis.

As can be seen, the two-level packing makes tight varying packing possible and easy. The first-level compiler packing makes inputs and outputs less which reduces the register file foot print size. The HW packing is simple and efficient. The packing process further reduces traffic bandwidth of inputs/outputs. The packing process 100 or 200 highly utilizes cache storage and saves power due to less traffic.

The GPU pipeline, shown in FIGS. 4 and 5, employs a generic linking for any two neighbor programmable processing stages. This allows hierarchical linking, mapping for big and complex varying structures, such as array and matrix to vectors and floats. The packing process allows the compiler 62 to re-order or re-allocate registers freely for optimization. The process allows the driver/linker to easily remove some of the VS outputs if they are not used in the FS by modifying some of the linking instructions.

In one or more exemplary configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

What is claimed is:

1. A device comprising:
a storage medium having at least one shared M-dimensional (MD) register, wherein the at least one shared MD register has at least one row, and each row has at least M slots; and
a processing unit to implement a set of operations to:
consecutively pack, in a first row of the at least one shared MD register, one or more shader variables from a vertex shader output file whose sum of components equals M;
detect whether the M slots of first row are full after loading each of the one or more shader variables in the first row;

continue to consecutively pack the first row upon detection that the M slots of the first row are not full; and
transfer the one or more shader variables packed in the first row of the at least one shared MD register to a respective MD cache register in a vertex cache, upon detection that the M slots of the first row are full.

2. The device of claim 1, wherein M equals 4, and wherein the set of operations packs the at least one shared MD register with one of: two 2D vector shader variables; a 3D vector shader variable and a float shader variable; a 2D vector shader variable and two distinct float shader variables; and four float shader variables.

3. The device of claim 1, wherein the one or more shader variables comprise a set of output varyings from a vertex shader; and wherein the set of operations includes operations to pack the set of output varyings in the at least one shared MD register.

4. The device of claim 3, further comprising: a vertex cache having a plurality of MD cache registers, the plurality of MD cache registers including the respective MD cache register; and wherein the storage medium includes a packing buffer comprising the at least one shared MD register.

5. The device of claim 4, wherein the processing unit implements a second set of operations to link the output varyings in the vertex cache to a set of input varyings for a fragment shader.

6. The device of claim 5, wherein the second set of operations includes operations to match varying symbol names corresponding to the output varyings in the vertex shader to corresponding varying symbol names in the set of input varyings for the fragment shader.

7. The device of claim 4, further comprising a second storage medium having a plurality of shared MD registers; wherein the one or more shader variables further comprise non-bypassed input attributes for input to the vertex shader and bypassed input attributes; and wherein the set of operations includes operations to pack M of the non-bypassed input attributes in each of the plurality of shared MD registers and populate any remaining non-bypassed input attributes in a vertex shader input file.

8. The device of claim 7, wherein the vertex cache further comprises a second plurality of MD cache registers; and wherein the storage medium includes a second packing buffer with an MD register to pack M components of the bypassed input attributes consecutively therein and transfer contents of the MD register of the second packing buffer when full into each MD cache register of the second plurality of MD cache registers in the vertex cache.

9. The device of claim 4, further comprising a second storage medium having a plurality of shared MD registers; wherein the one or more shader variables comprise a set of input attributes for input to the vertex shader; and wherein the set of operations includes operations to pack the set of input attributes in the plurality of shared MD registers until components of remaining unpacked input attributes would exceed M, if packed, and populate the remaining input attributes in a vertex shader input file.

10. The device of claim 1, wherein the processing unit is a portion of one of a cellular phone, a wireless device, a wireless communications device, a video game console, a personal digital assistant (PDA), a laptop computer, and an audio/video-enabled device.

11. An integrated circuit comprising:
a storage medium having at least one shared M-dimensional (MD) register, wherein the at least one shared MD register has at least one row, and each row has at least M slots; and
a processing unit to implement a set of operations to:
consecutively pack, in a first row of the at least one shared MD register, one or more shader variables whose sum of components equals M;
detect whether the M slots of first row are full after loading each of the one or more shader variables in the first row;
continue to consecutively pack the first row upon detection that the M slots of the first row are not full; and
transfer the one or more shader variables packed in the first row of the at least one shared MD register to a respective MD cache register in a vertex cache, upon detection that the M slots of the first row are full.

12. The integrated circuit of claim 11, wherein M equals 4, and wherein the set of operations packs the at least one shared MD register with one of: two 2D vector shader variables; a 3D vector shader variable and a float shader variable; a 2D vector shader variable and two distinct float shader variables; and four float shader variables.

13. The integrated circuit of claim 11, wherein the one or more shader variables comprise a set of output varyings from a vertex shader; and wherein the set of operations includes operations to pack the set of output varyings in the at least one shared MD register.

14. The integrated circuit of claim 13, further comprising: a vertex cache having a plurality of MD cache registers, the plurality of MD cache registers including the respective MD cache register; and wherein the storage medium includes a packing buffer comprising the at least one shared MD register, the packing buffer configured to consecutively pack M components of the vertex shader output file into the respective MD cache register in the vertex cache.

15. The integrated circuit of claim 14, wherein the processing unit implements a second set of operations to link the output varyings in the vertex cache to a set of input varyings for a fragment shader.

16. The integrated circuit of claim 15, wherein the second set of operations includes operations to match varying symbol names corresponding to the output varyings in the vertex shader to corresponding varying symbol names in the set of input varyings for the fragment shader.

17. The integrated circuit of claim 14, further comprising a second storage medium having a plurality of shared MD registers; wherein the one or more shader variables further comprise non-bypassed input attributes for input to the vertex shader and bypassed input attributes; and wherein the set of operations includes operations to pack M of the non-bypassed input attributes in each of the plurality of shared MD registers and populate any remaining non-bypassed input attributes in a vertex shader input file.

18. The integrated circuit of claim 17, wherein the vertex cache further comprises a second plurality of MD cache registers; and wherein the storage medium includes a second packing buffer with an MD register to pack M components of the bypassed input attributes consecutively therein and transfer contents of the MD register of the second packing buffer when full into each MD cache register of the second plurality of MD cache registers in the vertex cache.

19. The integrated circuit of claim 14, further comprising a second storage medium having a plurality of shared MD registers; wherein the one or more shader variables comprise a set of input attributes for input to the vertex shader; and wherein the set of operations includes operations to pack the set of input attributes in the plurality of shared MD registers until components of remaining unpacked input attributes would exceed M, if packed, and populate the remaining input attributes in a vertex shader input file.

20. The integrated circuit of claim 11, wherein the processing unit is a portion of one of a cellular phone, a wireless device, a wireless communications device, a video game console, a personal digital assistant (PDA), a laptop computer, and an audio/video-enabled device.

21. A wireless device comprising:
storing means having a plurality of shared M-dimensional (MD) registers;
packing means for consecutively packing in each shared MD register one or more shader variables of the set of shader variables whose sum of components equals M;
detecting means for determining whether one of the plurality of shared MD registers is full; and
transferring means for transferring M components of the one of the plurality of shared MD registers to a respective MD cache register in a vertex cache, upon detection that the the one shared MD register is full.

22. The wireless device of claim 21, wherein M equals 4, and wherein the packing means comprises means for packing the at least one shared MD register with at least one of: two 2D vector shader variables; a 3D vector shader variable and a float shader variable; a 2D vector shader variable and two distinct float shader variables; and four float shader variables.

23. The wireless device of claim 21, wherein the set of shader variables comprises a set of output varyings from a vertex shader; and wherein the packing means comprises varying packing means for packing the set of output varyings in the plurality of shared MD registers and populating means for populating any remaining varyings in the storing means in a vertex shader output file.

24. The wireless device of claim 21, wherein the set of shader variables comprises a set of input attributes to a vertex shader; and wherein the packing means comprises attribute packing means for packing the set of input attributes in the plurality of shared MD registers and populating means for populating any remaining input attributes in the storing means in a vertex shader input file.

25. The wireless device of claim 21, wherein the packing means is a portion of one of a cellular phone, a wireless device, a wireless communications device, a video game console, a personal digital assistant (PDA), a laptop computer, and an audio/video-enabled device.

26. A computer program product including a non-transitory computer readable storage medium having instructions that when executed cause one or more computers to:
pack a shader variable into a shared M-dimensional (MD) vector register of a plurality of shared MD vector registers, the shared MD vector register having M slots;
determine whether the M slots of the shared MD vector register are full after packing the shader variable;
consecutively pack at least a portion of another shader variable into the shared MD vector register, after determining that the M slots are not full; and
transfer the one or more shader variables packed in M slots of the shared MD vector register to a respective MD cache register in a vertex cache, after determining that the M slots are full.

27. The computer program product of claim 26, wherein the set of shader variables includes a set of output varyings from a vertex shader; and wherein the instructions cause the computer to pack the set of output varyings and populate remaining vector registers with remaining output varyings.

28. The computer program product of claim 27, further comprising instructions to cause the computer to link the packed set of output varyings to a set of input varyings for a fragment shader.

29. The computer program product of claim 28, wherein the instruction to link includes instructions to cause the computer to match varying symbol names corresponding to the packed set of output varyings from the vertex shader to corresponding varying symbol names in the set of input varyings for the fragment shader.

30. The computer program product of claim 26, wherein the set of shader variables includes a set of input attributes to a vertex shader; and wherein the instructions cause the computer to pack the set of input attributes and populate remaining vector registers with remaining input attributes.

31. A method in an electronic device, the method comprising:
packing one or more shader variables of a set of shader variables whose sum of vectors equals M into each shared M-dimensional (MD) vector register of a plurality of MD vector registers;
repeating the packing in the plurality of shared MD vector registers until any remaining shader variables are unpackable;
creating a vertex shader output file with the packed set of shader variables and remaining shader variables;
packing M components of the vertex shader output file consecutively in an MD temp register of a packing buffer;
detecting that the MD temp register is full; and
transferring contents of the MD temp register to a respective MD cache register in a vertex cache upon detection that the MD temp register is full,
wherein the method is performed in the electronic device.

32. The method of claim 31, wherein the set of shader variables comprises a set of output varyings from a vertex shader; and wherein the packing includes packing the set of output varyings in the plurality of shared M-dimensional (MD) registers.

33. The method of claim 31, wherein the set of shader variables comprises a set of non-bypassed input attributes to a vertex shader; and wherein the packing includes packing the set of input attributes in the plurality of shared MD registers.

34. The method of claim 33, further comprising:
packing M components of bypassed input attributes consecutively in an MD temp register of a packing buffer; and
transferring contents of the MD temp register when full to a respective MD cache register in a vertex cache.

35. A processor comprising:
a storage medium having at least one shared M-dimensional (MD) register, wherein the at least one shared MD register has at least M slots; and
an integrated circuit to implement a set of operations to:
consecutively pack, in the at least one shared MD register, one or more shader variables whose sum of components equals M;
determine whether the M slots of the at least one shared MD register are full after loading each of the one or more shader variables in the at least one shared MD register;
proceed to consecutively pack the at least one shared MD register upon detection that the M slots of the at least one shared MD register are not full; and
transfer the one or more shader variables packed in the first row of the at least one MD register to a respective MD cache register in a vertex cache, upon detection that the M slots of the at least one shared MD register are full.

36. The processor of claim 35, wherein the one or more shader variables comprises a set of output varyings from a vertex shader; and wherein the set of operations includes operations to pack the set of output varyings in the plurality of shared M-dimensional (MD) registers and populate any remaining varyings in the storage medium in a vertex shader output file.

37. The processor of claim 36, further comprising: a vertex cache having a plurality of MD cache registers, the plurality of MD cache registers including the respective MD cache register; and wherein the storage medium includes a packing buffer comprising the at least one shared MD register.

* * * * *